United States Patent [19]
Gassmann et al.

[11] Patent Number: 5,935,036
[45] Date of Patent: *Aug. 10, 1999

[54] METHOD AND DEVICE FOR CONTROLLING A COUPLING

[75] Inventors: Theodor Gassmann, Siegburg; Franz-Josef Oberdörster, Neunkirchen-Seelscheid, both of Germany

[73] Assignee: GKN Automotive AG, Lohmar, Germany

[ * ] Notice: This patent is subject to a terminal disclaimer.

[21] Appl. No.: 08/542,438

[22] Filed: Oct. 12, 1995

Related U.S. Application Data

[63] Continuation of application No. 08/292,337, Aug. 17, 1994, Pat. No. 5,556,343.

[30] Foreign Application Priority Data

Dec. 17, 1993 [DE] Germany .............................. 43 43 307

[51] Int. Cl.⁶ ...................................................... F16D 35/02
[52] U.S. Cl. ........................................ 475/87; 192/85 AA
[58] Field of Search .......................... 475/87, 86; 192/35, 192/57, 85 AA, 103 F

[56] References Cited

U.S. PATENT DOCUMENTS

| | | | |
|---|---|---|---|
| 4,058,027 | 11/1977 | Webb | 475/87 |
| 4,905,808 | 3/1990 | Tomita et al. | 192/103 F |
| 4,960,011 | 10/1990 | Asano . | |
| 4,966,268 | 10/1990 | Asano et al. | 192/58 C |
| 4,982,808 | 1/1991 | Taureg et al. | 180/233 |
| 5,007,515 | 4/1991 | Shimizu | 192/58 A |
| 5,007,885 | 4/1991 | Yamamoto et al. | 475/231 |
| 5,012,908 | 5/1991 | Kobayashi et al. | 192/85 AA |
| 5,031,743 | 7/1991 | Morishita et al. | 192/58 C |
| 5,036,963 | 8/1991 | Murata | 192/35 |
| 5,056,640 | 10/1991 | Yamamoto | 192/85 AA |
| 5,063,738 | 11/1991 | Asano et al. | 60/329 |
| 5,070,975 | 12/1991 | Tanaka et al. | 192/35 |
| 5,080,187 | 1/1992 | Asano et al. | 180/248 |
| 5,127,503 | 7/1992 | Gratzer | 192/58 B |
| 5,178,249 | 1/1993 | Haga et al. | 192/85 AA |
| 5,197,583 | 3/1993 | Sakai et al. | 192/35 |
| 5,259,488 | 11/1993 | Oberdorster et al. | 192/58 A |
| 5,526,912 | 6/1996 | Gassmann | 192/57 |
| 5,556,343 | 9/1996 | Gassmann et al. | 475/87 |

FOREIGN PATENT DOCUMENTS

| | | |
|---|---|---|
| 0283821 | 3/1988 | European Pat. Off. . |
| 0549828 | 12/1991 | European Pat. Off. . |
| 0480175 | 4/1992 | European Pat. Off. . |
| 0549828 | 7/1993 | European Pat. Off. . |
| 938813 | 7/1949 | Germany . |
| 4103054 | 8/1991 | Germany . |
| 4032245 | 3/1992 | Germany . |
| 6487928 | 4/1989 | Japan . |
| 1126440 | 5/1989 | Japan . |
| 1220728 | 8/1989 | Japan . |
| 251626 | 2/1990 | Japan . |
| 2120529 | 5/1990 | Japan . |
| 2120530 | 5/1990 | Japan . |
| 3069829 | 3/1991 | Japan . |
| 369829 | 3/1991 | Japan . |
| 2110796 | 6/1983 | United Kingdom . |
| 2202602 | 9/1988 | United Kingdom . |
| 2222232 | 2/1990 | United Kingdom . |
| 2241771 | 9/1991 | United Kingdom . |

*Primary Examiner*—Dirk Wright
*Attorney, Agent, or Firm*—Dinnin & Dunn, P.C.

[57] ABSTRACT

A coupling for transmitting torque between two parts has a friction coupling with a chamber including a piston and a rotational member. A pumping and control member is positioned in the chamber and includes at least one shear channel. The pumping and control member is rotatable between two positions such that viscous fluid moves through the channel to load the coupling.

44 Claims, 20 Drawing Sheets

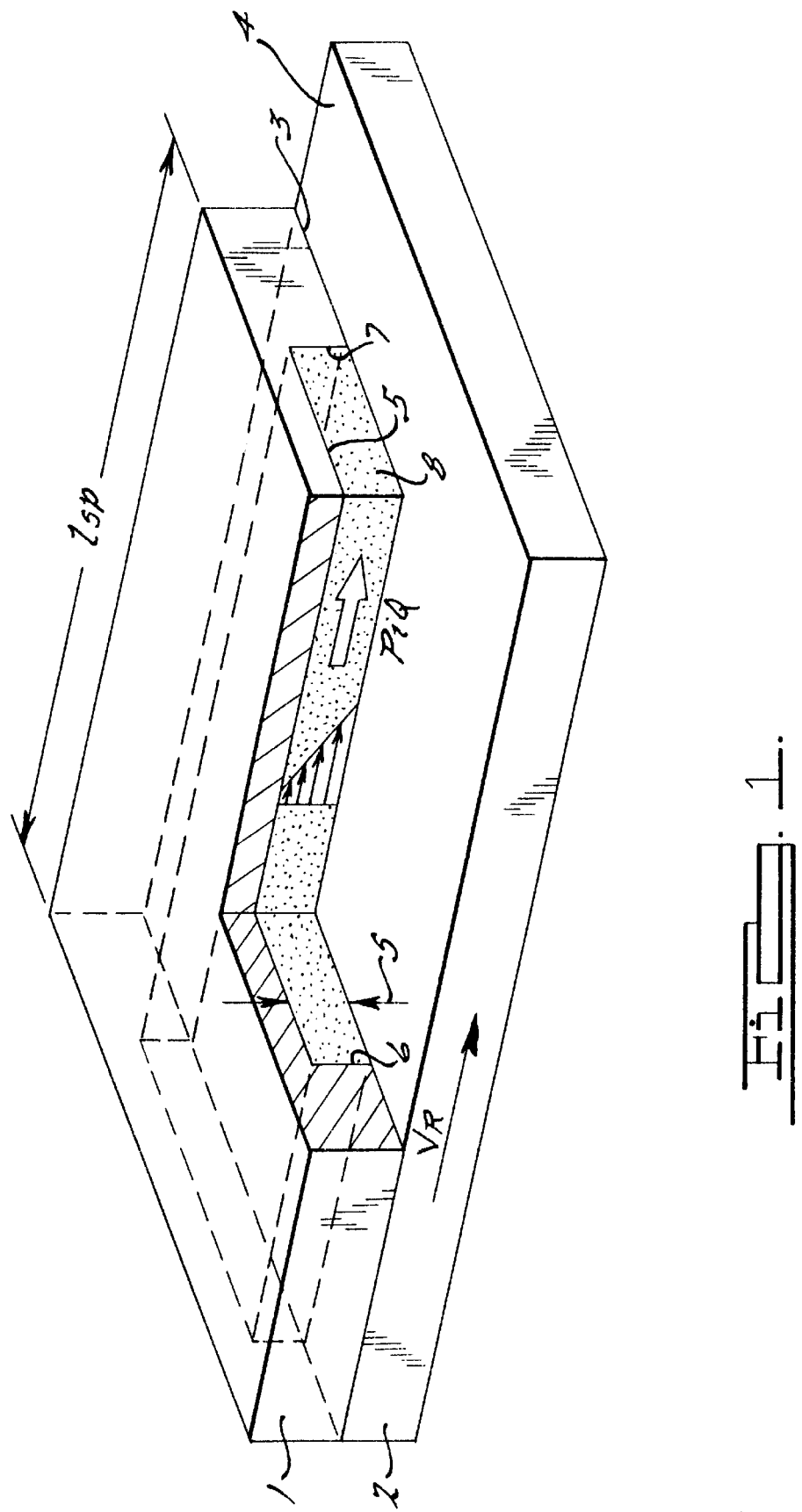

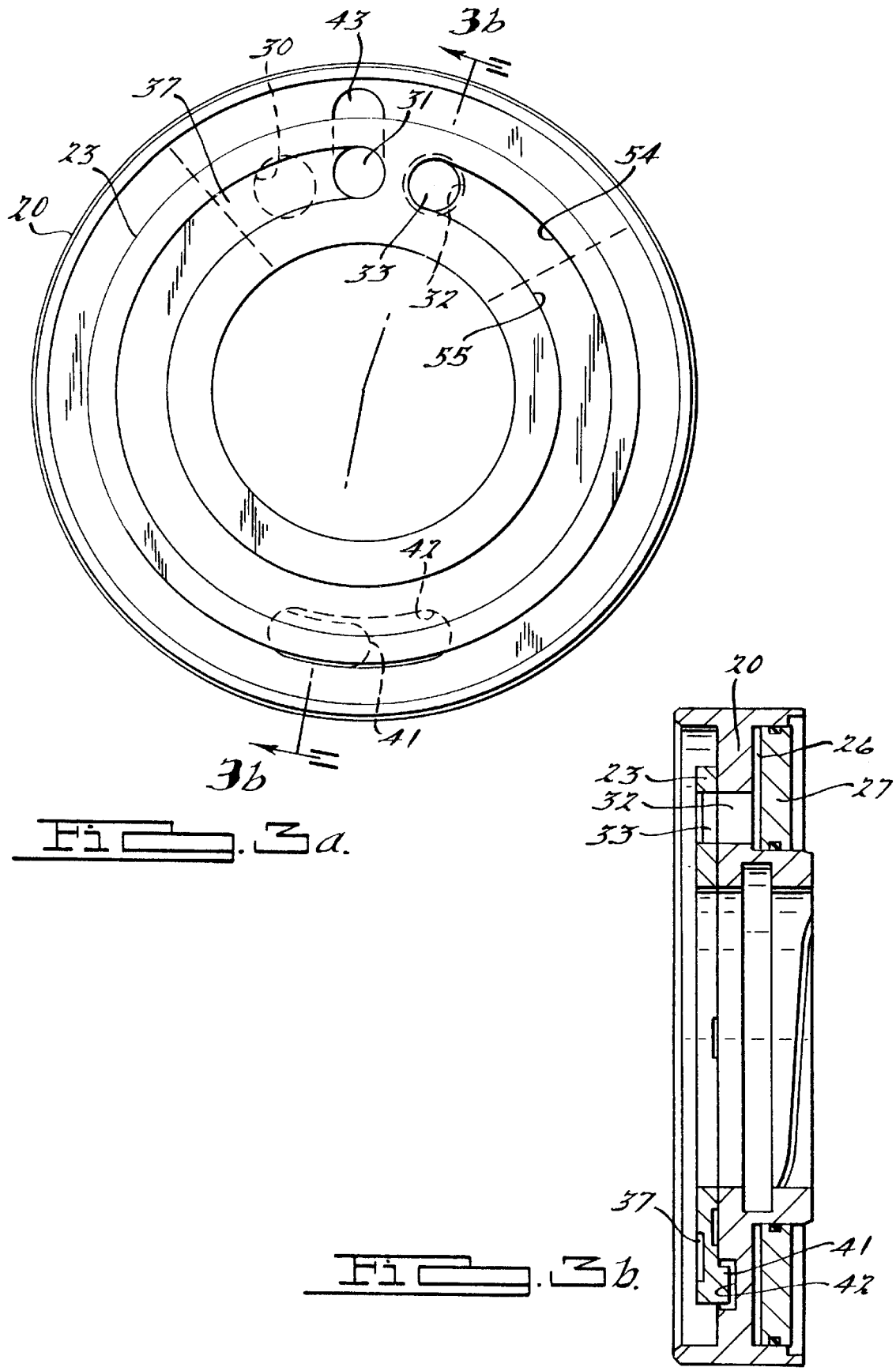

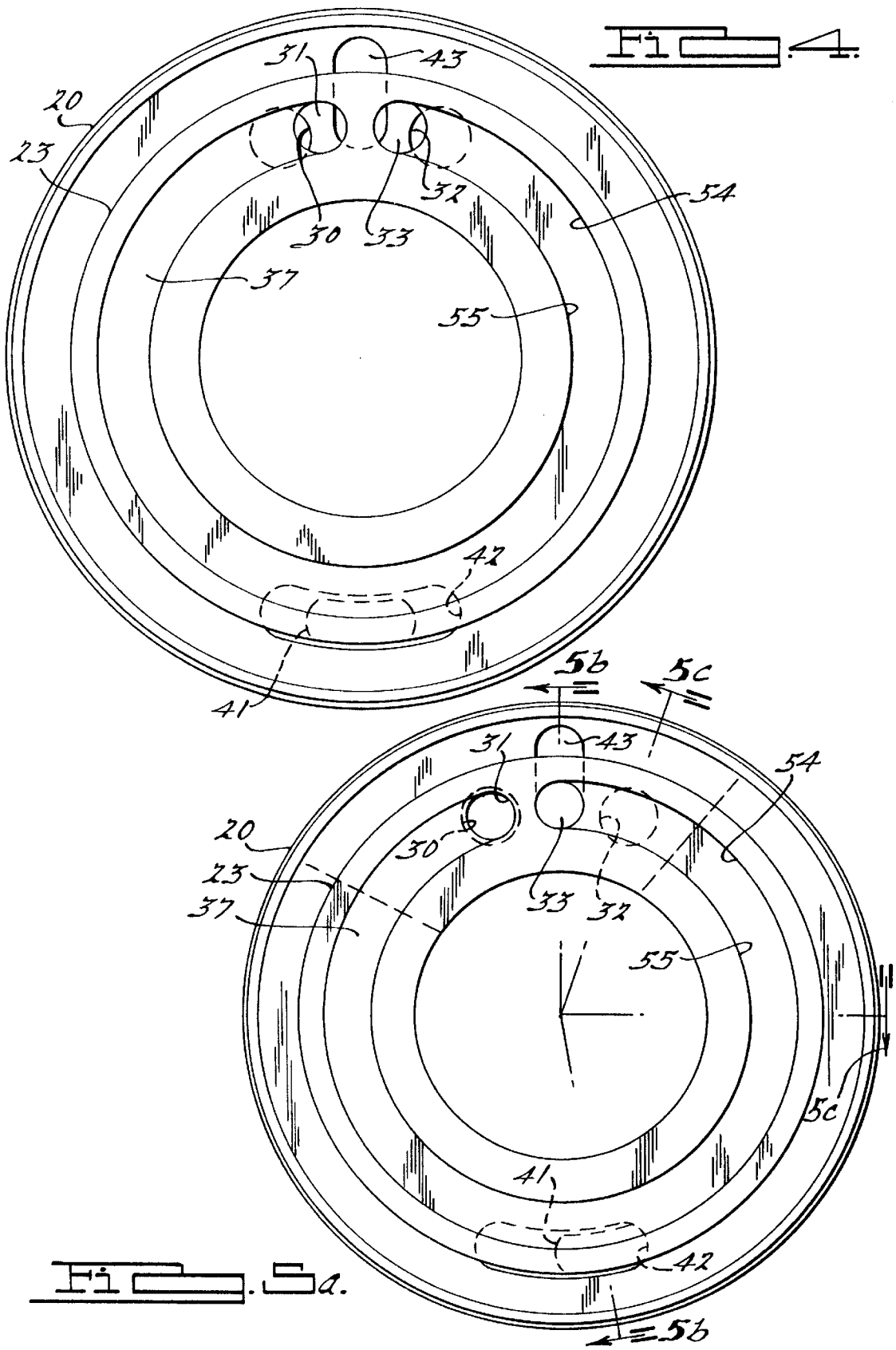

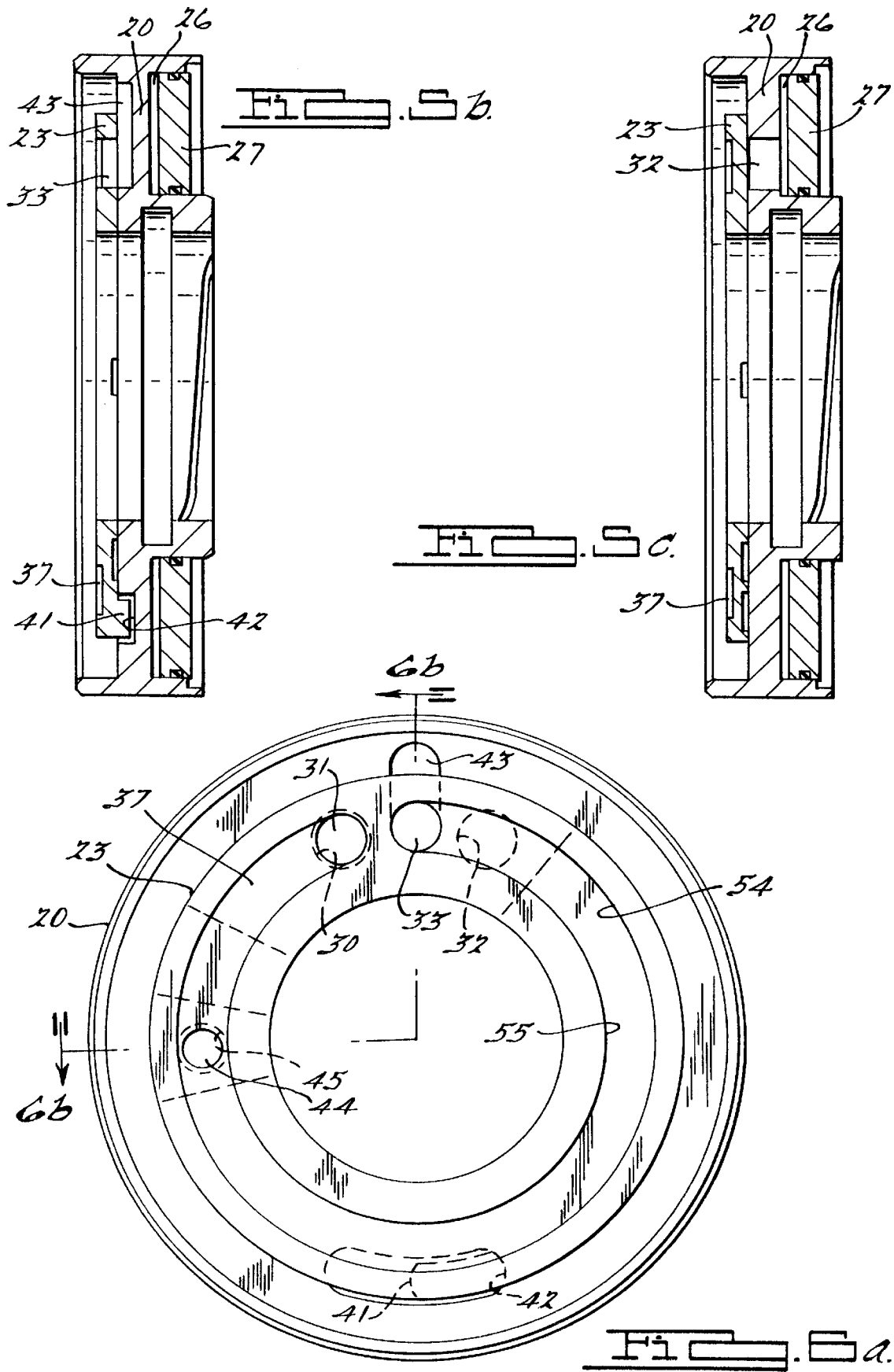

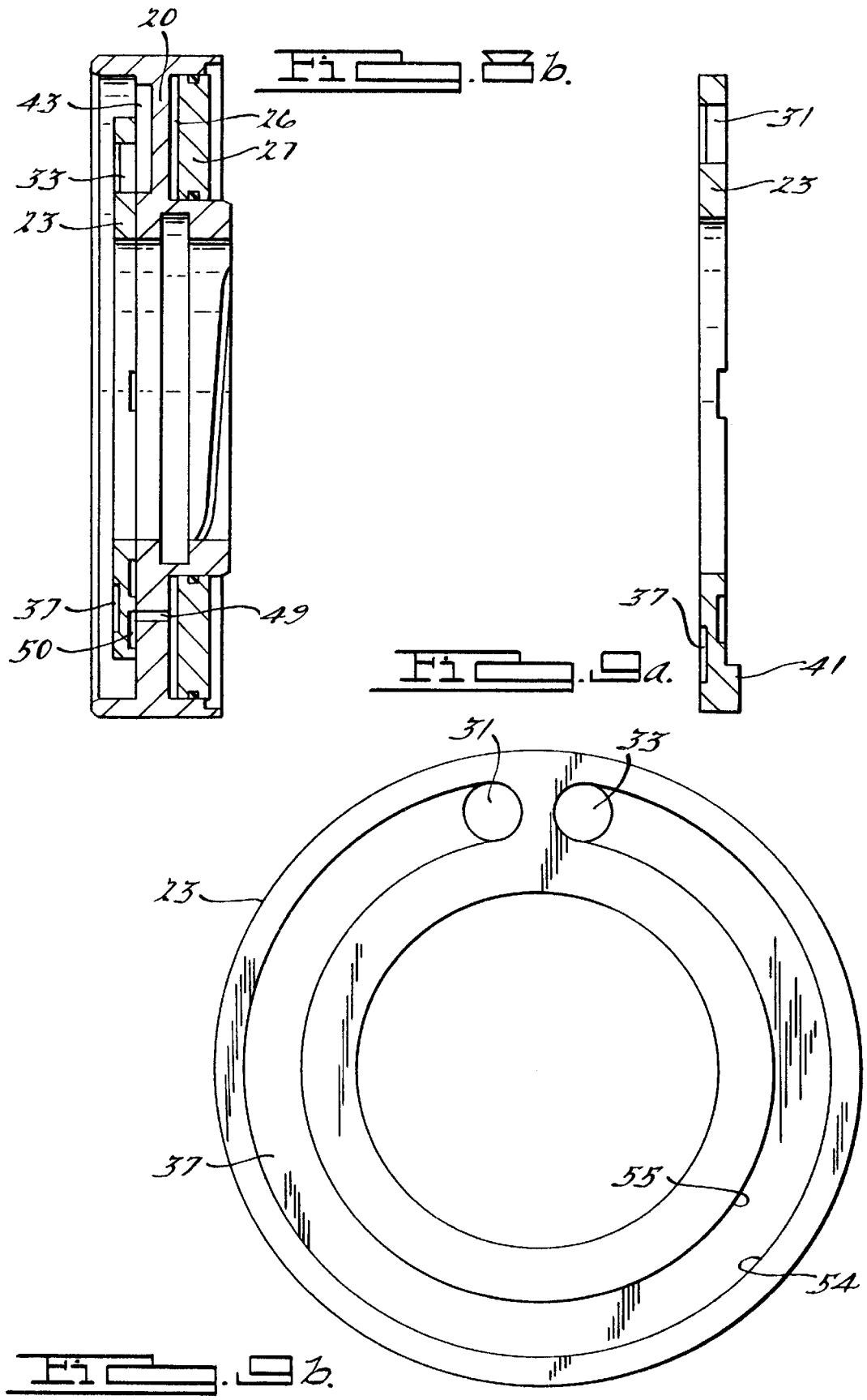

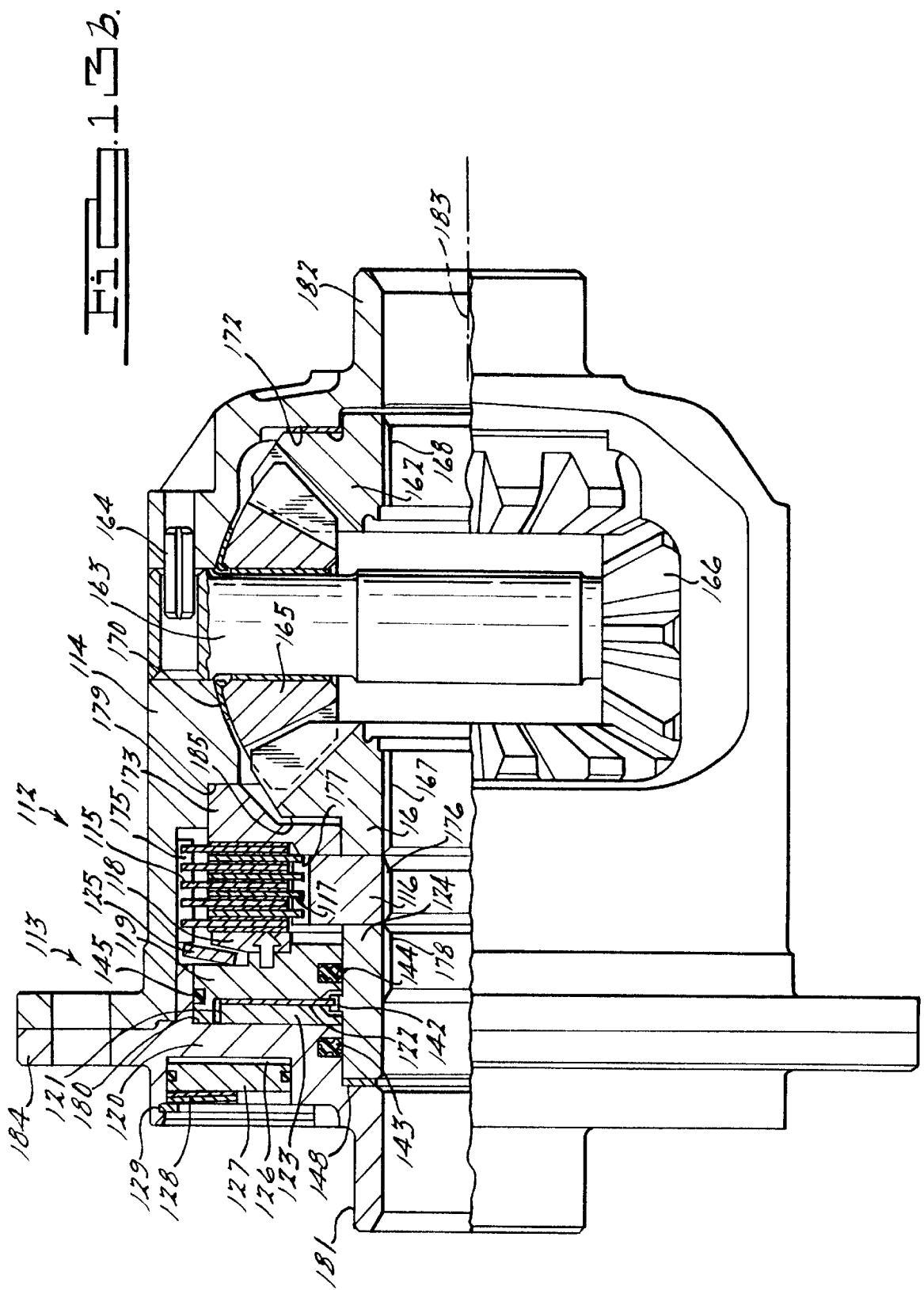

METHOD AND DEVICE FOR CONTROLLING A COUPLING

This is a continuation application of application Ser. No. 08/292,337 filed Aug. 17, 1994, U.S. Pat. No. 5,556,343.

DESCRIPTION

The invention relates to a method of controlling a coupling for transmitting torque between two parts rotatable relative to one another, comprising a friction coupling whose friction elements are alternately non-rotatably connected to the one and the other of the parts rotatable relative to one another, the friction coupling being subjectable to load by at least one adjustable piston which delimits one end of a pressurised chamber in a rotational housing, said pressurised chamber being filled with a viscous fluid, being connected to a reservoir and accommodating a rotational member rotatable relative thereto, as well as a coupling suitable for carrying out said method and designed to transmit torque between two parts rotatable relative to one another, comprising a friction coupling whose friction elements are alternately non-rotatably connected to the one and the other of the parts rotatable relative to one another, said friction coupling being subjectable to load by at least one adjustable piston which delimits one end of a pressurised chamber, which pressurised chamber is filled with a viscous fluid, which is connected to a reservoir and whose rotational housing is formed by one of the rotatable parts and the piston rotating therewith and in which there rotates a rotational member connected to the other one of the rotatable parts. The viscous fluid is meant to be one with a high viscosity, such as it is commonly used in viscous couplings for example.

A method and coupling of this type are known from U.S. Pat. No. 905,808 where, if there occurs a speed differential between the rotatable parts, a disc which is star-shaped in an axial view rotates in a chamber filled with a viscous fluid. Between the disc and the housing of the chamber, because of the behaviour of the fluid, a dynamic pressure for actuating the friction coupling is built up and applied to a piston delimiting the chamber. There are few possibilities of varying the characteristics of the coupling as a function of the differential speed; essentially, only the filling level and the viscosity of the fluid are freely selectable. A further disadvantage refers to the low achievable pressure level and the resulting low performance density.

Furthermore, the invention relates to a differential drive for being used in the drivelines of motor vehicles, having a differential carrier to be supported in a differential drive housing, first and second output bevel gears arranged coaxially relative to one another and at least two differential bevel gears supported so as to be normal to the axes thereof, having a friction coupling whose first friction elements are held non-rotatably in the differential carrier and whose second friction elements are held non-rotatably on a first axle shaft gear of said axle shaft gears, and having a control device comprising a pressurised chamber which is filled with a viscous fluid and whose rotational housing is formed by the differential carrier and a movable piston rotating therewith. In the same way, the invention relates to a differential drive of the said type, having a friction coupling whose first friction elements are non-rotatably arranged relative to the first of the axle shaft gears and whose second friction elements are non-rotatably arranged relative to the second of the axle shaft gears, and furthermore having a control device analogously associated with the axle shaft gears.

Differential drives of said type are known from U.S. Pat. No. 4,012,968, with the actuating device comprising a displacer pump.

Assemblies of the said type are used in the drivelines of motor vehicles and land machinery for generating, as a function of the differential speed, a locking moment between two parts rotating relative to one another.

A first application refers to differential drives in the case of which the coupling is used between parts which rotate relative to one another when differential processes occur in the drive. Because of the effect of the coupling, said differential drives have a self-locking effect. Such differential drives are preferably axle differentials or central differentials in motor vehicles.

A second application refers to a motor vehicle with a permanently driven axle and an axle which is driven only from case to case, with the coupling being incorporated directly into a driveline associated with the latter axle. As a result, the respective driveline is torque-loaded due to the effect of the coupling when a speed differential occurs between the associated axle and the permanently driven further axle, whereas when the axles rotate at equal speeds, the effect of the coupling causes the driveline to remain torque-free, with the respective axle following in a torque-free way.

As compared to torque sensing systems, differential speed sensing couplings and self-locking differentials of e type referred to in this context have definite advantages in respect of traction and driving dynamics.

It is therefore the object of the present invention to provide a method of controlling a coupling and a differential speed sensing coupling in a simple design with a high performance density and a wide range of selectable characteristics. In particular, it is to be ensured that the coupling is filled completely under all operating conditions and during its entire service life.

It is also the object of the present invention, to provide a differential drive having a control device in a simple design with a high performance density and a wide range of selectable characteristics.

The solution proposed hereby consists in a method which is characterised in that, upon rotation of the rotational member relative to the pressurised chamber, the pressure applied to the piston is generated by the shearing action of the viscous fluid contained in at least one sealed shear channel extending between two ends in the circumferential direction and that the processes of supplying fluid to the shear channel from the reservoir and of tapping off pressure from the shear channel for the purpose of subjecting the piston to load are recontrolled as a function of the direction of relative rotation of the parts rotatable relative to one another in such a way that the fluid is supplied to what constitutes the front end of the shear channel with reference to the direction of relative rotation and that the pressure is tapped off from what constitutes the rear end of the shear channel with reference to the direction of relative rotation.

Furthermore, the solution consists in providing a coupling which is characterised in that rotational faces of the rotational member and counter faces of a pumping and control member positioned in the pressurised chamber constitute at least one sealed shear channel which is formed by a groove laterally delimited by walls and extending between two ends in the circumferential direction and by a surface covering said shear groove and being rotatable relative thereto; that the pumping and control member is rotatable to a limited extent between two end positions relative to the rotational housing; and that the groove, by control apertures in the pumping and control member arranged at the ends of the said groove, is connected to the reservoir positioned in the rotational housing and to the presurised chamber between the piston and the rotational member in such a way that in the two end positions of the pumping and control member, the control aperture arranged at what constitutes the front end of the groove with reference to the direction of relative rotation communicates with the reservoir and that the control aperture arranged at what constitutes the rear end of the groove with reference to the direction of relative rotation communicates with the pressurised chamber.

The solution is based on an operating principle which is referred to as pressure drag flow principle and which is based on the shear effect of a viscous medium between two plates moved relative to one another. In the case of such a relative movement, part of the medium—with reference to one of the plates—is conveyed in the direction of the movement of the other plate. If a gap between two plates which extends substantially parallel to the direction of the relative movement constitutes a shear groove and is laterally sealed and delimited at two ends and covered by a surface movable in the direction of the groove, there is obtained a shear channel which, as a function of the magnitude and direction of the relative movement, conveys fluid from one end of the said shear channel to the other end. The conveying pressure is directly proportional to the length of the shear channel, the viscosity of the sheared medium and the shear rate, i.e. the relative speed. If the shear channel is arranged in such a way that it connects two chambers to one another and that the two parts forming the shear channel are connected to the one and the other of the rotating parts of a coupling, there is generated a differential-speed-dependent conveying pressure which may be used in that the pressure in a pressurised chamber is increased, which acts on at least one piston which applies a load on the friction faces of a friction coupling. According to the method as proposed by the invention, at least the one shear channel, by being recontrolled, is used to generate pressure independently of the specific direction of the rotational movement of the parts relative to one another. In an advantageous way, it is proposed that, at the point in time of recontrolling the shear channel, the shear channel end previously used for tapping off pressure is directly connected to the reservoir so that the decrease in pressure at this end does not have to take place via the entire length of the shear channel.

To achieve different characteristics of the assembly as a function of the direction of relative rotation, it is proposed in a further preferred embodiment that in one of the two directions of relative rotation of the parts rotatable relative to one another, only part of the length of the shear channel should be used for building up pressure by providing an additional connection between the reservoir and the shear channel in a portion between the ends of the latter, which connection is open in only one direction of relative rotation and closed in the second direction of relative rotation.

To achieve different characteristics of the assembly as a function of the direction of relative rotation, it is proposed in a similar preferred embodiment that in one of the two directions of relative rotation, there is provided an additional direct connection between a portion positioned between the ends of the shear channel and the pressurised chamber in order to shorten the effective channel length for the pressure build-up, which direct connection is closed in the second direction of relative rotation.

The method is improved further in that there are provided temperature-dependent throttling means in a bypass in the connecting channel between the reservoir and the pressurised chamber, with the help of which the temperature-dependent behaviour of the viscous fluid may be balanced.

In principle, it is possible for the surfaces of the pumping and control member and the complementary counter faces of the rotational member forming at least the one shear channel to be radially planar or conical or cylindrical. Preference is given to the first design involving a disc-like shape of the pumping and control member and of the rotational member.

In a concrete embodiment, at least the one shear channel is formed by a circumferentially extending groove in only one of the rotational faces of the pumping and control member and by a complementary contacting surface at the rotational member rotatable relative thereto.

It is important to provide spring means for axially pressing together the rotational member and the pumping and control member in order to ensure that the shear channel remains closed and that the pressure between the rotational member and piston remains effective.

According to a first design version it is proposed that two connecting channels between the reservoir and the shear channel are provided with an angular offset of 2 $\alpha$ relative to one another; that halfway there between, there is arranged a connecting channel leading from the shear channel to the pressurised chamber; and that the control apertures in the control member constitute an angular offset of $\alpha$ relative to one another; and that the control member is rotatable by the angle $\alpha$ and that the shear groove extends over an angle of $(360°-\alpha)$.

In the above-mentioned case, recontrolling requires only a small rotational angle $\alpha$ of the pumping and control member.

In an alternative embodiment it is proposed that a connecting channel is provided between the reservoir and the shear channel; that symmetrically thereto, two connecting channels leading from the shear channel to the pressurised chamber each are positioned at an angular offset of 2 $\alpha$ relative to the former; and that the control member is rotatable by an angle of $(360°-\alpha)$ and that the shear groove extends over an angle of $(360°-\alpha)$.

In the above case, if the direction of relative rotation is reversed, the locking effect is gentler and occurs with a delay in terms of time.

In a further alternative it is proposed that a connecting channel is provided between the reservoir and the shear channel; that symmetrically thereto, two connecting channels leading from the shear channel to the pressurised chamber are each positioned at an angular offset of $\alpha$ relative to the former; that the control member is rotatable by an angle $\alpha$ and that the groove, with its ends rotationally overlapping one another, extends spiral like over an angle of $(360°-\alpha)$. The function is the same as in the alternative mentioned first.

Furthermore, it is proposed that the control apertures at the ends of the shear groove are provided in the form of axial bores in the disc-like pumping and control member, which axial bores extend from the one end face which at least in the region of the apertures rests sealingly against an end wall in the rotational housing where there terminate connecting channels leading to the reservoir, as far as the groove positioned in the opposed second end face, said second end face resting sealingly against a radial end face, and in each end position, only one of the control apertures overlaps with a connecting channel.

In a further concrete embodiment it is proposed that the connecting channel leading to the pressurised chamber is provided in the form of a radial groove in an end wall of the rotational housing, which radial groove, in each of the two end positions, overlaps with one of the two control apertures at the ends of the groove.

To achieve the above-mentioned different characteristics as a function of the direction of relative rotation, it is possible for the further control aperture to be provided in the form of an axial bore in the disc-like pumping and control member, which axial bore terminates in the central portion of the shear groove and, in only one of the end positions, overlaps with an additional connecting channel leading to the reservoir.

The same purpose is served by an embodiment in the case of which the further control aperture is provided in the form of an axial bore in the disc-like pumping and control member, which axial bore terminates in the central portion of the shear groove and, in only one of the end positions, overlaps with an additional radial connecting channel leading to the pressurised chamber and designed as a radial groove in the rotational housing.

To compensate for the influence of temperature on the viscosity of the fluid it is possible to provide a bypass positioned between the reservoir and the pressurised chamber and accommodating a control member whose cross-section changes as a function of the temperature and which leaves a gap S.

The above-mentioned relative rotability of the pumping and control member is limited in that the pumping and control member is provided with a rotary stop which engages a circumferential groove in the rotational housing, with the circumferential length of said groove being limited.

Depending on the required curve of the locking torque generated by the friction coupling as a function of the differential speed, it is possible to correct the effective forces. For this purpose it is possible to provide spring means which are supported on the housing and which subject the plates to load at the end facing the piston, or to provide spring means which are supported on the housing and which subject the piston to load at the end facing the plates or that there are provided spring means which, in a pretensioned condition, are arranged between the piston and the friction coupling, constantly subjecting same to a minimum force.

The reservoir may be formed by the rotational housing and by an axially movable, spring-loaded piston rotating therewith or by a spring-loaded membrane or it may comprise a resilient compensating element in a chamber forming the reservoir. The viscous fluid contained therein may be a dilatant medium whose viscosity increases as a function of the shear rate $s^{-1}$.

The solution further consists in providing a locking differential which is characterised in that a rotational member non-rotatably connected to the first axle shaft gear rotates in the pressurised chamber, that the rotational faces of the rotational member, together with counter faces of the rotational housing, constitute at least one sealed shear channel which is formed by a groove laterally delimited by walls and extending between two ends in the circumferential direction and by a surface covering said groove and being rotatable relative thereto; that in the case of a speed differential between the parts forming the shear channel, the piston, as a result of a pressure build-up in the shear channel, is displaced in the direction of the friction coupling and subjects the friction coupling to load, and that the pressurised chamber is connected to a reservoir whose size is variable.

In a preferred embodiment, there is provided an adjustable pressure plate which, with reference to the friction coupling, is positioned axially opposite the piston, which, when the output bevel gears are torque-free, is supported on the end face of the differential carrier and which, when the output bevel gears are torque-loaded, is displaced in the direction of the friction coupling by one of the output bevel gears being supported on the differential bevel gears of which there are provided at least two, and loads the friction coupling.

In this way, there is provided a locking differential which comprises first differential-speed-dependent control means for the locking device with a high performance density and which, in the said preferred embodiment, comprises second torque-dependent actuating means for the friction coupling to be able to build up a locking effect even when starting from the stationary position. This is an important requirement when starting on difficult road or off-highway surfaces, and at the same time it is advantageous that, at higher speeds, the system uses its differential speed sensing characteristics to achieve better driving dynamics.

Torque-dependent actuation is achieved by loading the friction coupling by one of the axle shaft gears of the bevel gear locking differential through a pressure plate arranged therebetween. An axial displacement of the respective axle shaft bevel gear is caused by the axial component of the reaction forces between the axle shaft bevel gears and the differential bevel gears, with the differential bevel gears being firmly supported on the differential carrier. The piston of the control device is still supported on the differential carrier. Only when, due to a speed differential between the said axle shaft bevel gear and the differential carrier, the piston of the control device applies an axial force which exceeds the axial force applied by the axle shaft bevel gear, does the latter rest against the differential carrier in the opposite direction, with the friction coupling being loaded by the piston force which is now higher and which increases proportionally with the differential speed.

All the above-mentioned details of the coupling in accordance with the invention, especially of the control device for the friction coupling apply either literally or analogously.

The invention also relates to motor vehicles which have been equipped with couplings in accordance with the invention and/or differential drives in accordance with the invention as claimed.

Reference is therefore made to the entire wording and contents of the claims.

To make this new operating principle more easily understandable and to explain preferred embodiments of the invention, reference will be made to the drawings wherein FIG. 1 is a partial section through two plates which are movable relative to one another, with a groove forming a shear gap being provided in one of the plates.

FIG. 3a is a plan view and FIG. 3b is a longitudinal section of a first embodiment of a pumping and control disc with a rotational member in the form of a detail in a first position.

FIG. 4 is a plan view of the pumping and control disc and the rotational member according to FIG. 3, in a second position.

FIG. 5a is a plan view and FIGS. 5b and 5c are two longitudinal sections of the pumping and control disc and the rotational member according to FIG. 3, in a third position.

FIG. 6a and FIG. 6c are plan views in two positions and FIG. 6b is a longitudinal section of a second embodiment of a pumping and control disc with a rotational member in the form of a detail.

FIG. 8a is a plan view and FIG. 8b is a longitudinal section of a fourth embodiment of pumping and control disc with a rotational member, in the form of a detail.

FIG. 9a is a section and FIG. 9b is a front view of a pumping and control disc in the form of a detail.

FIGS. 13a and 13b show a first embodiment of a bevel gear differential in accordance with the invention.

Figure 2A:
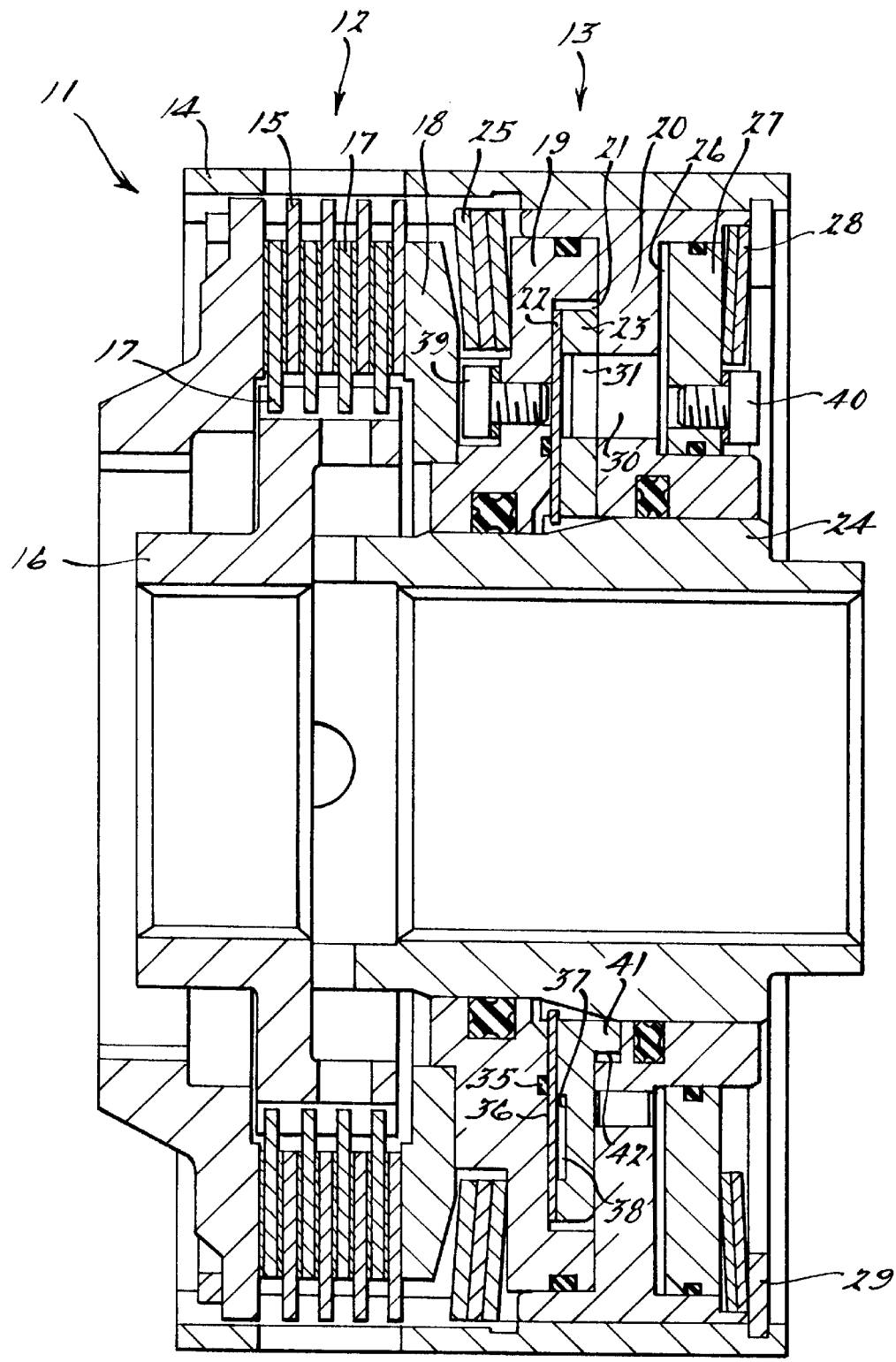
FIG. 2a is a longitudinal section through a first embodiment of a coupling in accordance with the invention.

FIG. 1 shows a section through a first plate or disc 1 and a second plate or disc 2 whose end faces 3, 4 contact one another. The first plate 1 is assumed to be fixed; the second plate 2 moves at a speed of $V_R$. The end face 3 of the first plate 1 is provided with a groove 5 which comprises a rectangular cross-section and delimiting side walls 6, 7. The groove 5 and the face 3 form a shear channel accommodating a viscous medium. The shear gap comprises a length $l_{sp}$ and a height or depth s. When the plate 2 moves, the medium in the shear groove behaves in accordance with the given linear speed profile referring to the fixed plate 1. Needless to say that at the surfaces there apply adhesion conditions, both for the plate 1 and for the plate 2, i.e. with reference to plate 2, the speed profile is reciprocal. With reference to plate 1, the shear effect of the shear gap generates a pressure p and a flow quantity Q.

As the applications illustrated here are not based on relative linear movements but on relative rotational movements, the groove forming the shear gap is preferably designed so as to extend circumferentially, as illustrated in one of FIGS. 2 to 12.

Figure 2B:
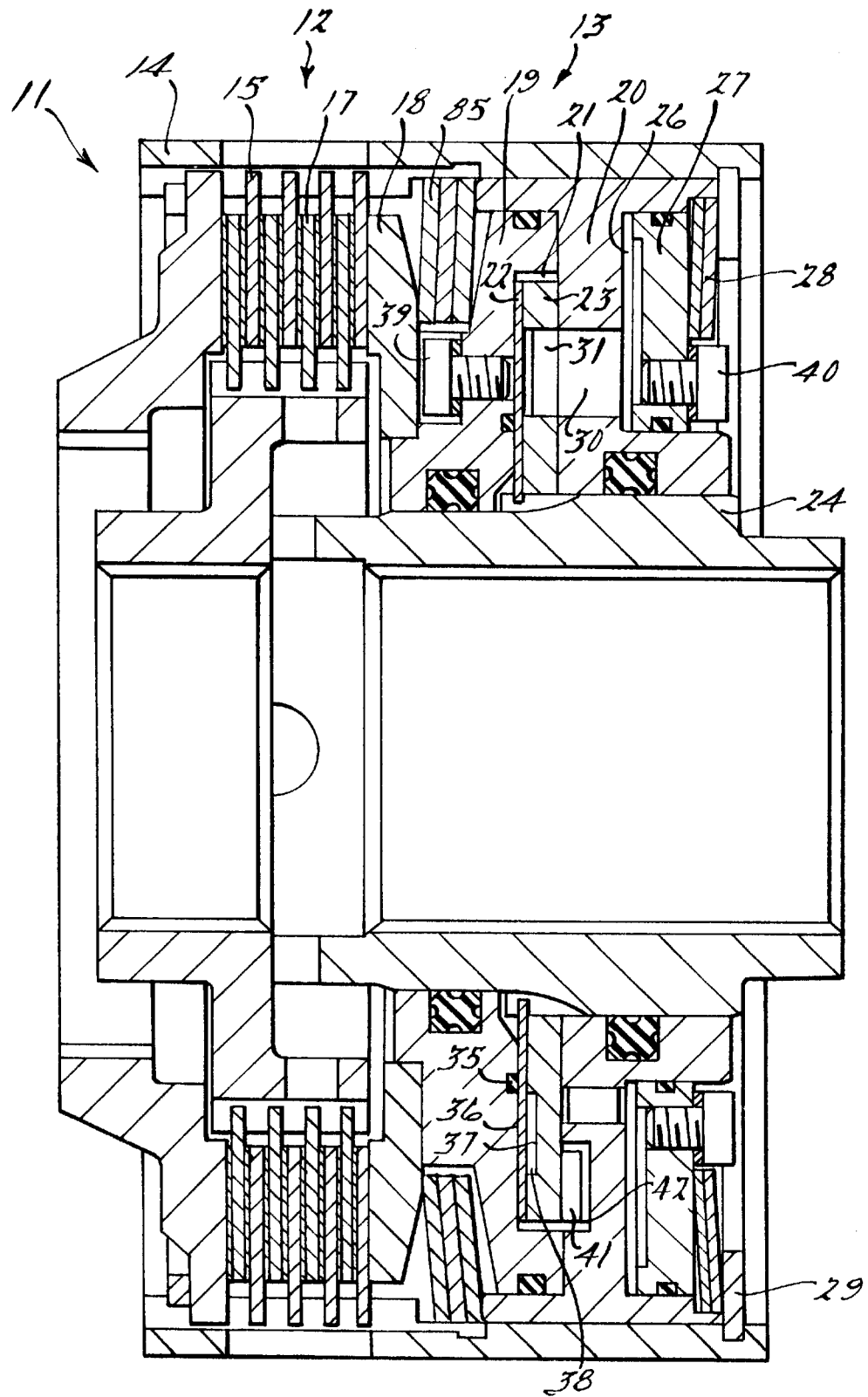
FIG. 2b is a longitudinal section of a modified version of a coupling in accordance with the invention.

FIGS. 2a and 2b differ in respect of one detail only and, below, will be described jointly. Each Figure shows a coupling assembly 11 comprising a controllable friction coupling 12 in the form of a multi-plate coupling and a speed sensing control assembly 13. The friction coupling comprises a housing 14 to be inserted into a differential carrier and non-rotatably holding outer plates 15, and a hub 16 non-rotatably accommodating inner plates 17. The friction coupling may be loaded by a pressure plate 18 which, in turn, is regulated by the above control assembly 13 which is arranged in the housing 14 and comprises an axially movable piston 19 and a rotational housing 20 which rotate in the housing 14. Both form a pressurised chamber 21 accommodating a disc-like rotational member 22 and a disc-like pumping and control member 23. The rotational member 22 is non-rotatably connected to a further hub 24 which is non-rotatably connected to the said first hub 16 and driven therewith; it may also be designed to be integral with the hub 16. A projecting rotary stop 41 engaging a delimited circumferential groove 42 in the rotational housing 20 ensures that the pumping and control member 23 is rotatable relative to the rotational housing 20 to a limited extent. The O-ring 35 incorporated into the piston 19 serves as a spring element and thus ensures that the rotational member 22 sealingly rests against the pumping and control member 23. If there is a change in the direction of rotation of the rotational member 22 driven with the help of teeth by the hub 16, the rotational member 22 moves the pumping and control member 23 out of its one end position determined by the rotary stop 41 and the circumferential groove 42 into the other end position determined by the rotational stop and circumferential groove. Furthermore, the rotational housing 20 comprises a reservoir 26 which is delimited by an axially movable annular piston 27. The latter is supported on the housing 20 by means of plate springs 28 so that the reservoir 26 always balances changes of volume in the pressurised chamber 21. The rotational housing 20 comprises an axial connecting channel 30 which, in the circumferential position as illustrated, overlaps with a control aperture 31 in the pumping and control member 23. The control aperture 31 is positioned at one end of a shear channel 38 which is formed by a circumferentially delimited groove 37 in the pumping and control member 23 and by the surface 36 of the rotational member 22. The parts rotating relative to one another are sealed relative to one another by seals. The gap between the rotational member 22 and the piston 19 on the radial outside of the O-ring 35 should be regarded as part of the pressurised chamber 21. Two bolts 39, 40 serve to fill and ventilate the pressurised chamber and the reservoir. FIG. 2a shows plate springs 25 which are supported on the housing 14 and act on the piston 19, thereby providing a counter force acting against the effect of the pressurised chamber. FIG. 2b shows plate springs 85 which are supported on the housing 14 and act on the pressure plate 18, thereby supporting the pressure force generated in the pressurised chamber.

FIG. 3 shows a plan view and an axial section of a rotational housing 20 and a pumping and control member 23 in the form of details. The plan view shows the circumferentially extending groove 37 which is delimited by side walls 54, 55 with control apertures 31 and 33 being positioned at the ends of said groove. The control aperture 33 shown in section is positioned above the connecting channel 32 in the rotational housing. The control aperture 31 positioned at the other end overlaps with a radial connecting channel 43 in the rotational housing not shown in the section. The position of a further through-aperture 30 in the rotational housing 20 is indicated by dashed lines. The rotary stop 41 and the circumferentially delimited groove 42 which are arranged at the rear end of the pumping and control member 23 and which limit the rotation of the pumping and control member 23 relative to the rotational housing 20 are indicated by dashed lines in the section and plan view.

FIG. 4 shows the same details as FIG. 3, but in a plan view, and having the same reference numbers. However, the rotary stop 41 is in a central position in circumferentially delimited groove 42 between the two possible end positions. As a result, both the control aperture 31 at the one end of the groove 37 where previously the pressure build-up took place and the second aperture 33 which, by means of the connecting channel 32, was previously connected to the reservoir and which still overlaps with the connecting channel 32 are still connected to the connecting channel 43 leading to the pressurised chamber. In this way it is possible, directly, to achieve a decrease in pressure from the connecting channel 43 and thus from the pumping space to the connecting channel 33 and thus to the reservoir.

FIG. 5 shows the same details as FIGS. 3 and 4 in a plan view and two sections, having the same reference numbers. However, the rotary stop 41 assumes the opposed end position in the circumferentially delimited groove 42. The control aperture 31 now overlaps with the second connecting aperture 30 leading to the reservoir, whereas the second control aperture 33 is connected to the connecting channel 43 leading to the pressurised chamber. The pressure build-up now takes place at the end of the groove 37 at the control aperture 33. The plan view indicates by dashed lines the position of the first connecting channel 32 leading to the reservoir, which has no function now.

Figure 6B:
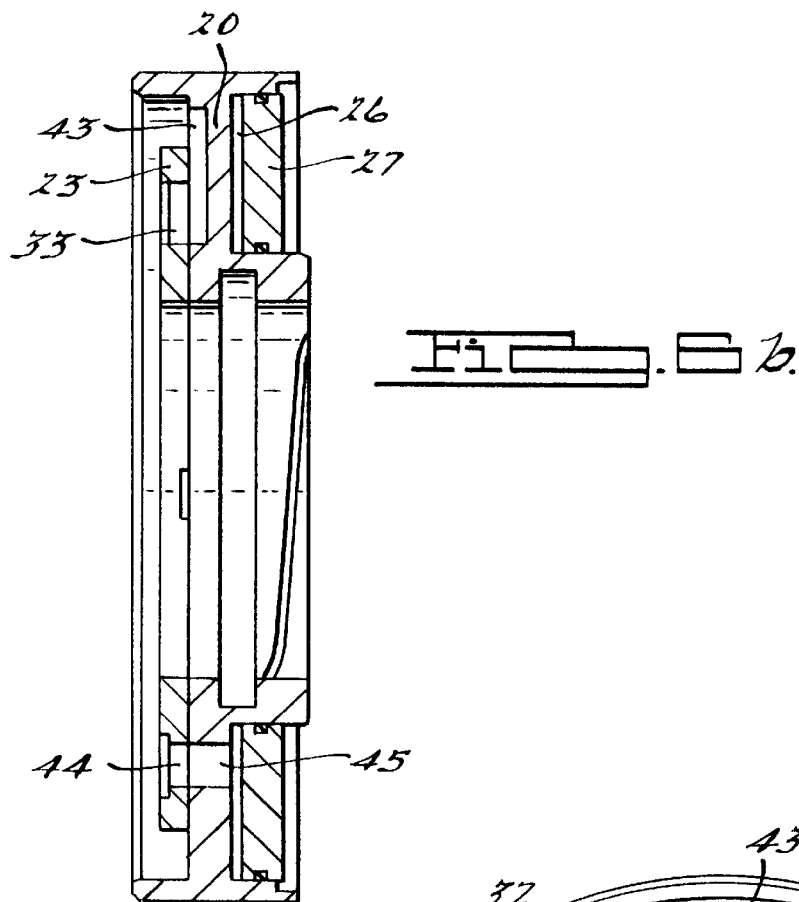

FIG. 6 shows an axial section and a plan view of a rotational member 22 and a pumping and control member 23 in two different positions in an embodiment which is modified as compared to FIGS. 3 to 5. To the extent that any details correspond to one another, they have been given the same reference numbers, and reference is therefore made to the previous description.

Figure 6C:
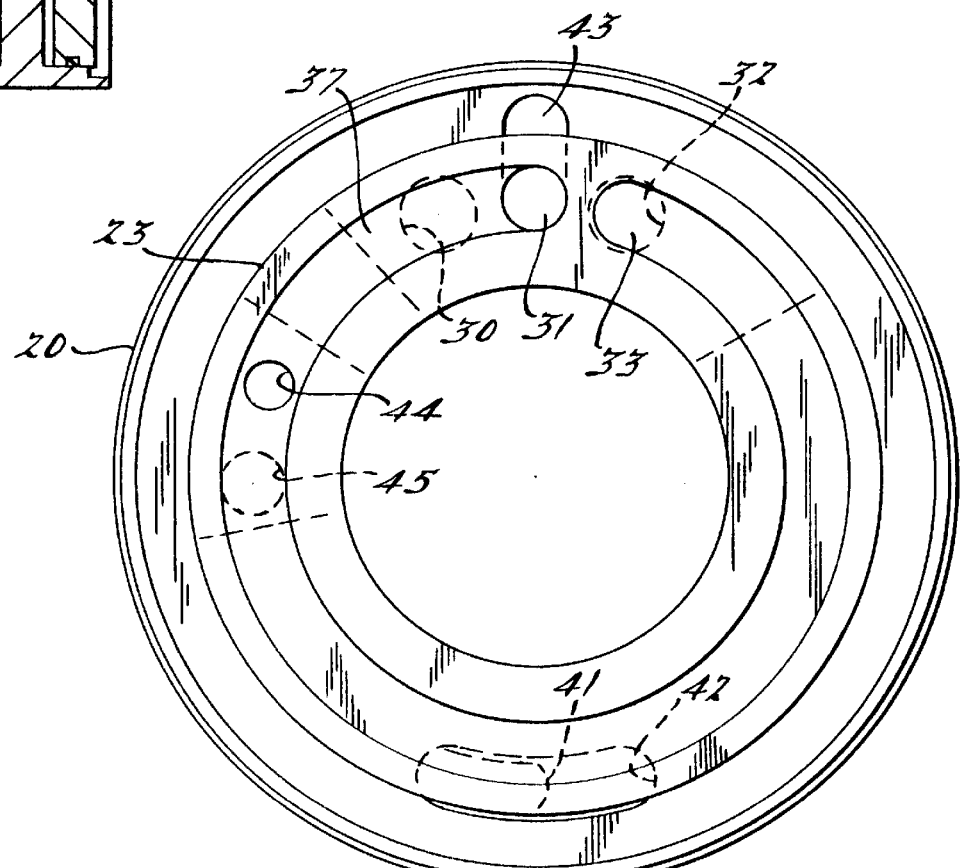

In addition, the pumping and control member 23 has an additional control aperture 44 in the groove 37, which is positioned between the two control apertures 31 and 33. Furthermore, the rotational housing 20 comprises an additional connecting channel 45 which, in the case of the position of the rotary stop 41 in the circumferentially delimited groove 42 and thus of the pumping and control member 23 relative to the rotational housing 20, overlaps with the control aperture 44. In this way, the effective pressure build-up does not take place over the entire length of the shear channel, but only over the angular portion between the control aperture 44 and the control aperture 33, with a lower pressure occurring at the connecting channel 43. In the opposite direction of rotation of the rotational member relative to the rotational housing, with the pumping and control member 23 and the rotational housing 20 assuming the positions as indicated in FIG. 6c, the control aperture 44 and the connecting channel 45 are offset relative to one another, so that the pressure build-up takes place along the entire length of the shear channel from the control aperture 33 to the control aperture 31, which leads to a higher pressure.

Figure 7A:
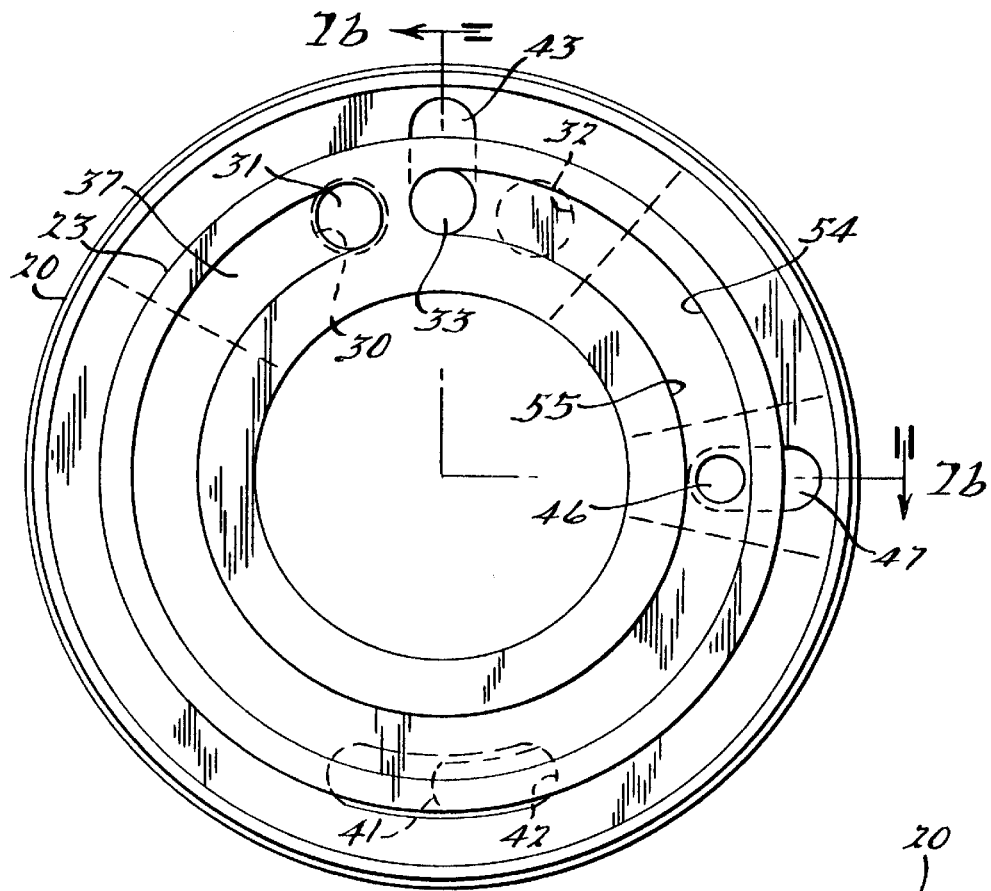
FIG. 7a and 7c are plan views in two positions and FIG. 7b is a longitudinal section of a pumping and control member, in the form of a of a third embodiment disc with a rotational detail.
Figure 7B:
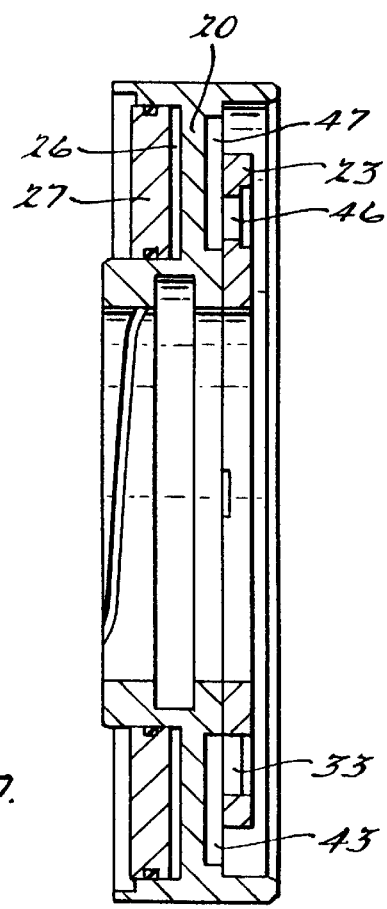
Figure 7C:
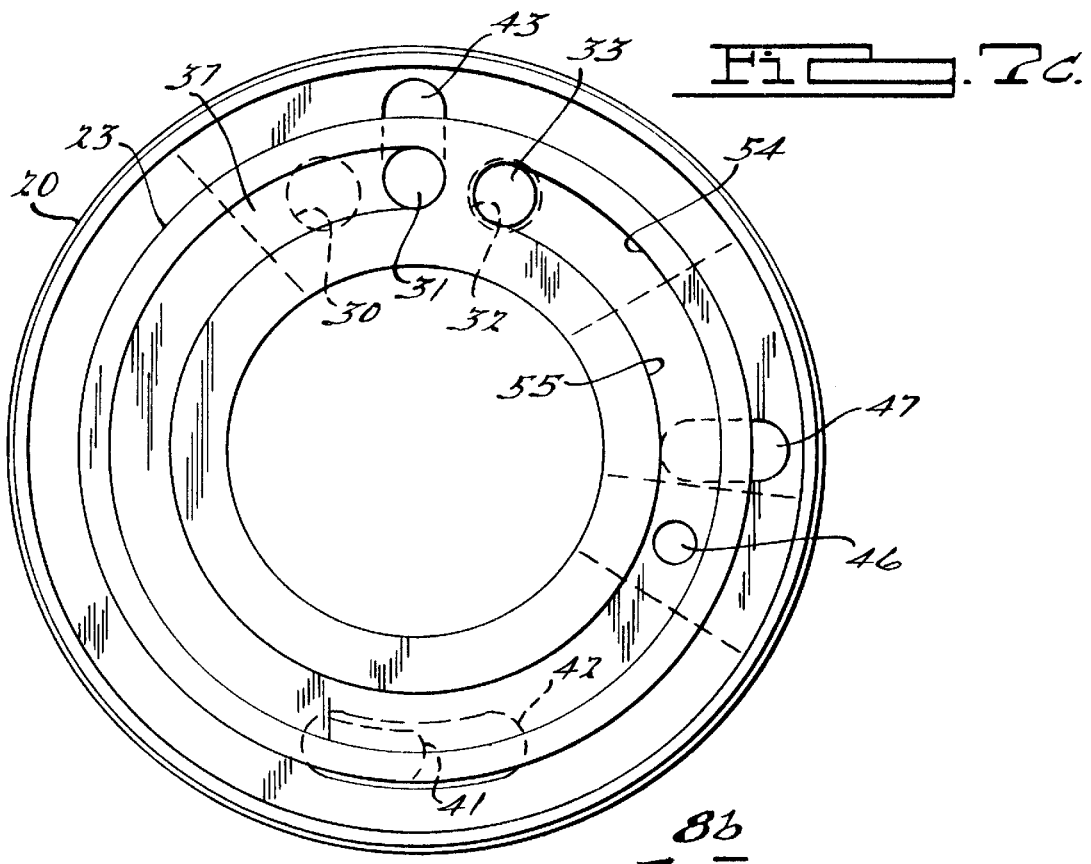

FIG. 7 shows an axial section and a plan view of a rotational member 22 and a pumping and control device 23 in two different positions in an embodiment which is modified as compared to FIGS. 3 to 5. Any details corresponding to one another have been given the same reference numbers. To that extent, reference is made to the previous description. In addition, the pumping and control disc comprises an additional control aperture 46 and the rotational housing comprises an additional connecting channel 47. In the case of the position of the rotary stop 41 in the circumferentially delimited groove 42 and thus of the pumping and control member 23 relative to the rotational housing 20 as illustrated in FIG. 7a, the control aperture 46 and the connecting channel 47 overlap. In this way, the pressure build-up in the shear channel 37 takes place only in the angular portion extending from the control aperture 31 connected to the reservoir by means of the connecting channel 30, to the control aperture 46 and the connecting channel 47 which terminates in the pressurised chamber. The remaining anular portion from the control aperture 46 to the control aperture 33 overlapping with the connecting channel 43 is not effective. This means that in the case of this direction of relative rotation between the rotational member and the rotational housing, less pressure is built up than in the opposite direction of rotation which is illustrated in FIG. 7c and corresponds to a position of the control apertures relative to the connecting channel 43 as shown in FIG. 3a. In this case, the control aperture 46 and the connecting channel 47 are offset relative to one another and do not become effective so that pressure is built up along the entire length of the shear channel from the control aperture 33 to the control aperture 31.

Figure 8A:
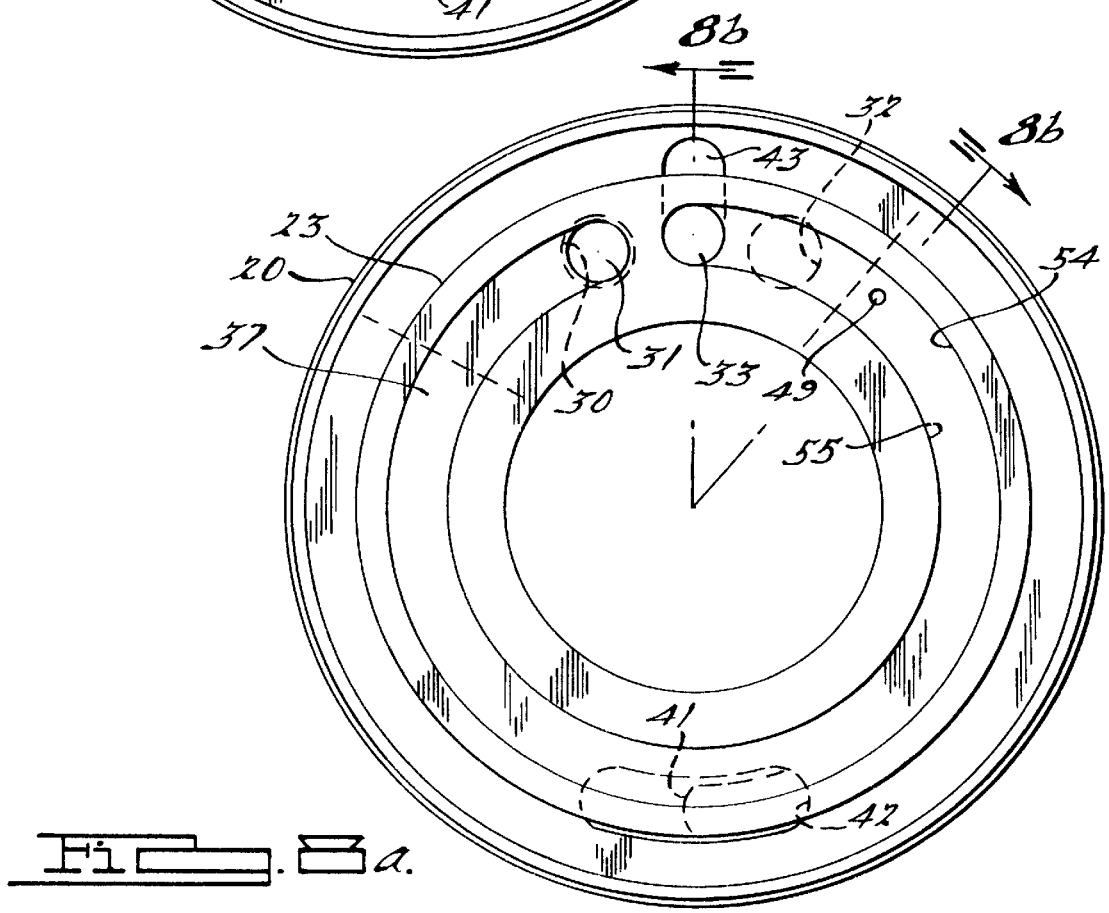

FIGS. 8a and 8b show a rotational housing 20, a pumping and control member 23 and a piston 27 which substantially correspond to those shown in FIGS. 5a and 5b. Any details corresponding to one another have been given the same reference numbers. To that extent, reference is made to the description of FIGS. 3 to 5. In addition, the rotational housing has been provided with a throttling bore 49 which communicates with the reservoir 26. The contacting face of the pumping and control member is provided with a recess 50 which is designed in such a way that in one end position of the rotary stop 41 relative to the circumferentially delimited groove 42, a connection between the pressurised chamber and the reservoir becomes effective, whereas in the second relative circumferential position, the throttling aperture 49 overlaps with the rear end of the pumping and control member 23 so that it becomes ineffective. In consequence, the pressure in the pressurised chamber is reduced in the one direction of relative rotation of the parts, so that in this case, too, different pressure values are generated as a function of the direction of relative rotation.

The sections are shown contrary to the standard type of illustration relative to the plan views.

FIGS. 9a and 9b, in the form of a detail, show a pumping and control member 23 of a type described above on several occasions, also indicating the control apertures 31, 33 and the groove 37 as well as the rotary stop in the form of details.

Figure 10A:
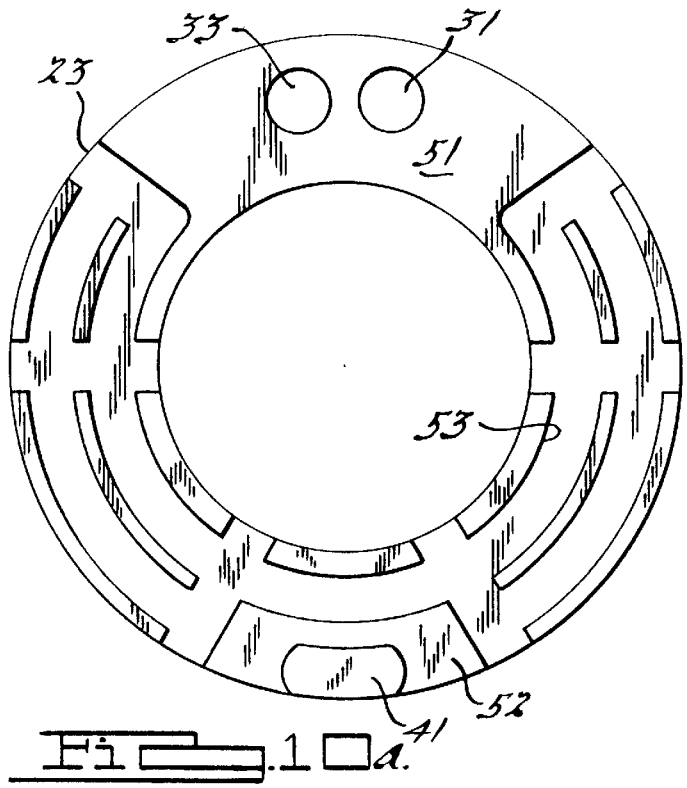
FIG. 10a is a rear view and FIG. 10b is a section of a pumping and control disc in the form of a detail.
Figure 10B:
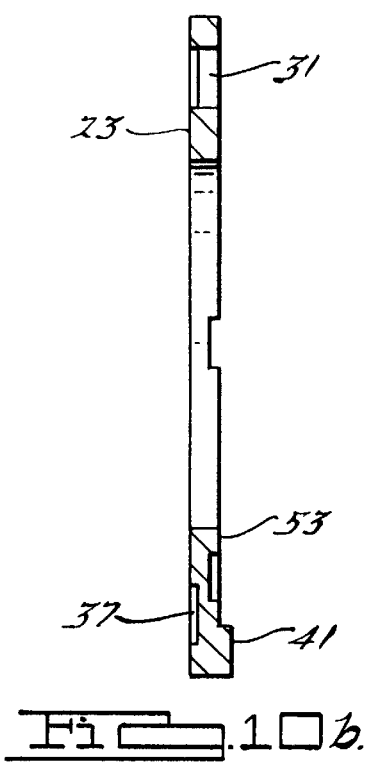

FIGS. 10a and 10b illustrate the pumping and control member 23 according to FIG. 9 from the rear and in the form of a section. They show the surface region 51 which comprises the control apertures 31, 33 and is designed in such a way that, depending on its position, it is able to rest sealingly on the connecting channels 30, 32, 43, 47. The surface region 51 is circumferentially delimited in such a way that, depending on its position, it is able alternately to open or close the throttling bore 49 described above in connection with FIG. 8. The remaining part of the surface, on its reverse side, comprises a plurality of annular ribs 53 to reduce friction and adhesion relative to the housing. A surface 52 arranged opposite the surface 51 comprises the rotary stop 41 projecting therefrom.

The sections are shown in the standard type of illustration relative to the plan views.

Figure 11A:
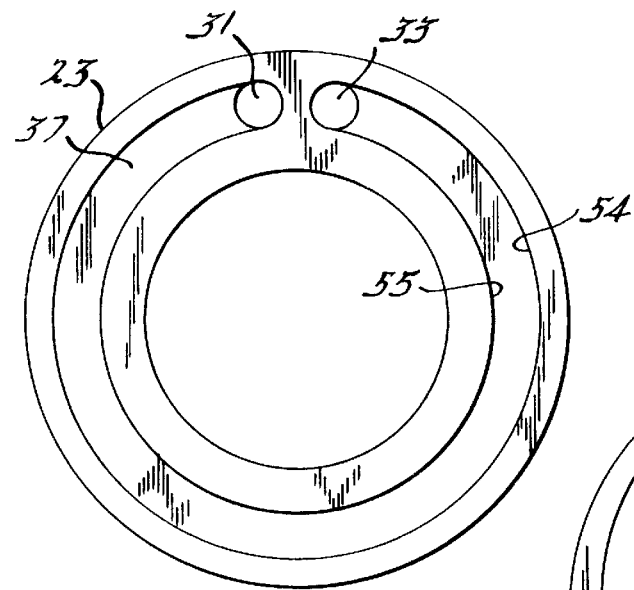
FIG. 11a is a plan view of the pumping and control disc according to FIG. 9b.

FIG. 11a, for comparative purposes, again shows a pumping and control member 23 according to FIG. 9a. The groove 37 has a circumferential length of 360°−α, so that, if said pumping and control member is rotated by the angle α, the one control aperture 31 assumes the position which was previously occupied by the control aperture 32.

Figure 11B:
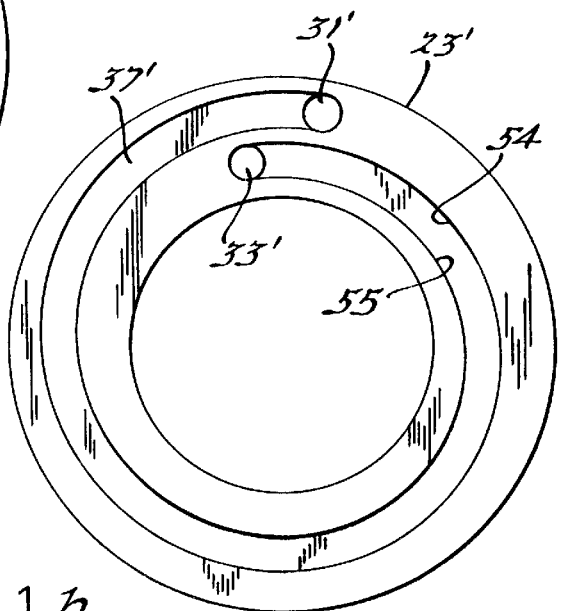
FIG. 11b shows a pumping and control disc with a modified version of the shear groove.

FIG. 11b illustrates a groove 37b which has a circumferential length of 360°+α, with the groove being slightly spiral-shaped. Again, if the pumping and control member 23b is rotated by the angle α, the control aperture 31b assumes the angular position which was previously occupied by the control aperture 3b, and vice versa.

Figure 12A:
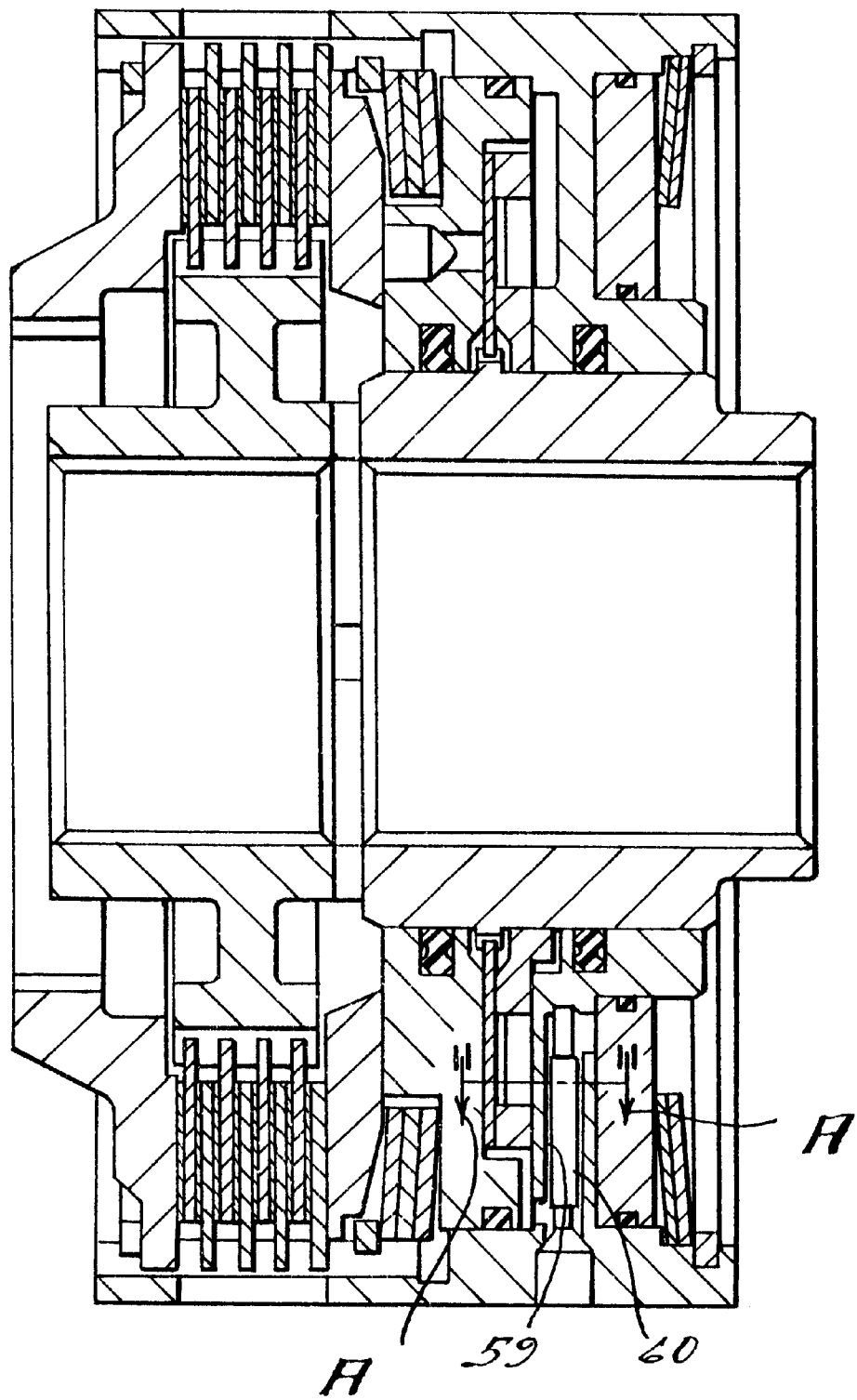
FIG. 12a shows a coupling in accordance with the invention, having a temperature sensing throttle element, in the first embodiment.
Figure 12B:
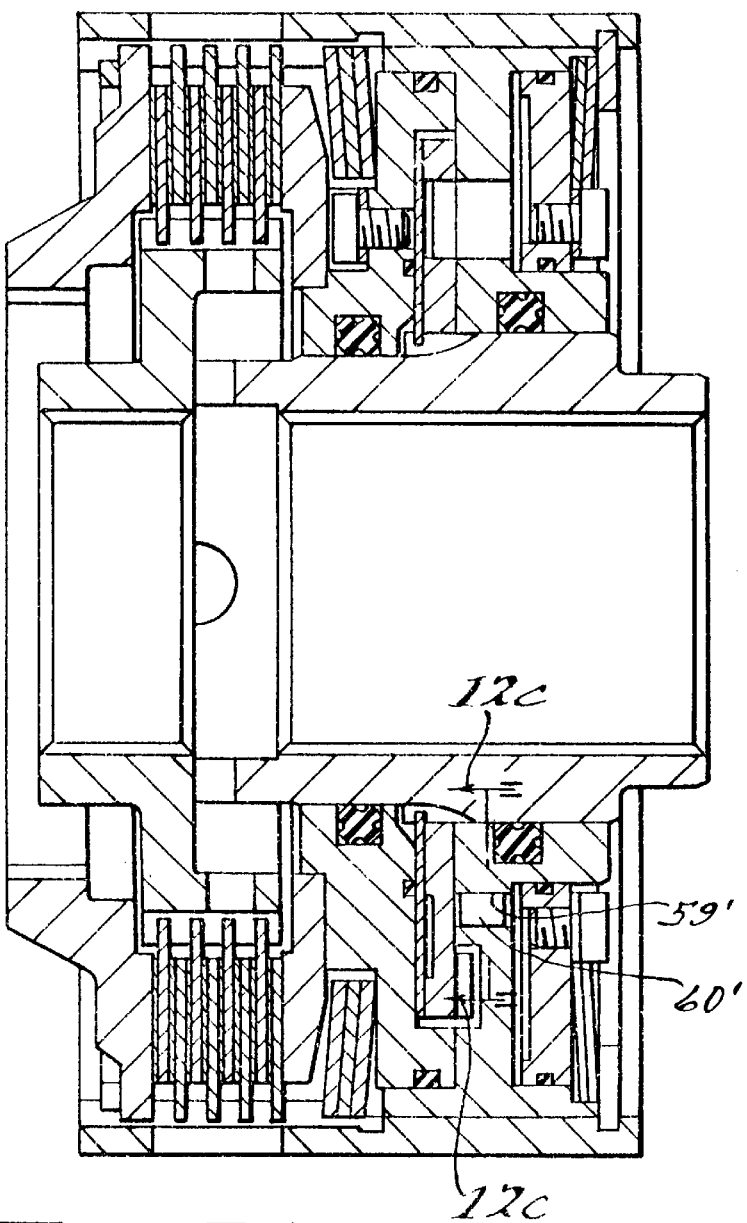
FIG. 12b shows a coupling in accordance with the invention, having a temperature sensing throttle element, in a second embodiment.
Figure 12C:
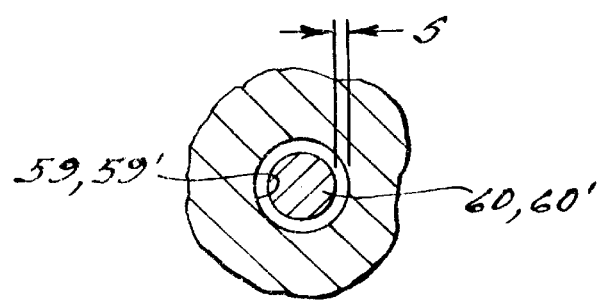
FIG. 12c is a detailed cross section from FIG. 12b.
Figure 17A:
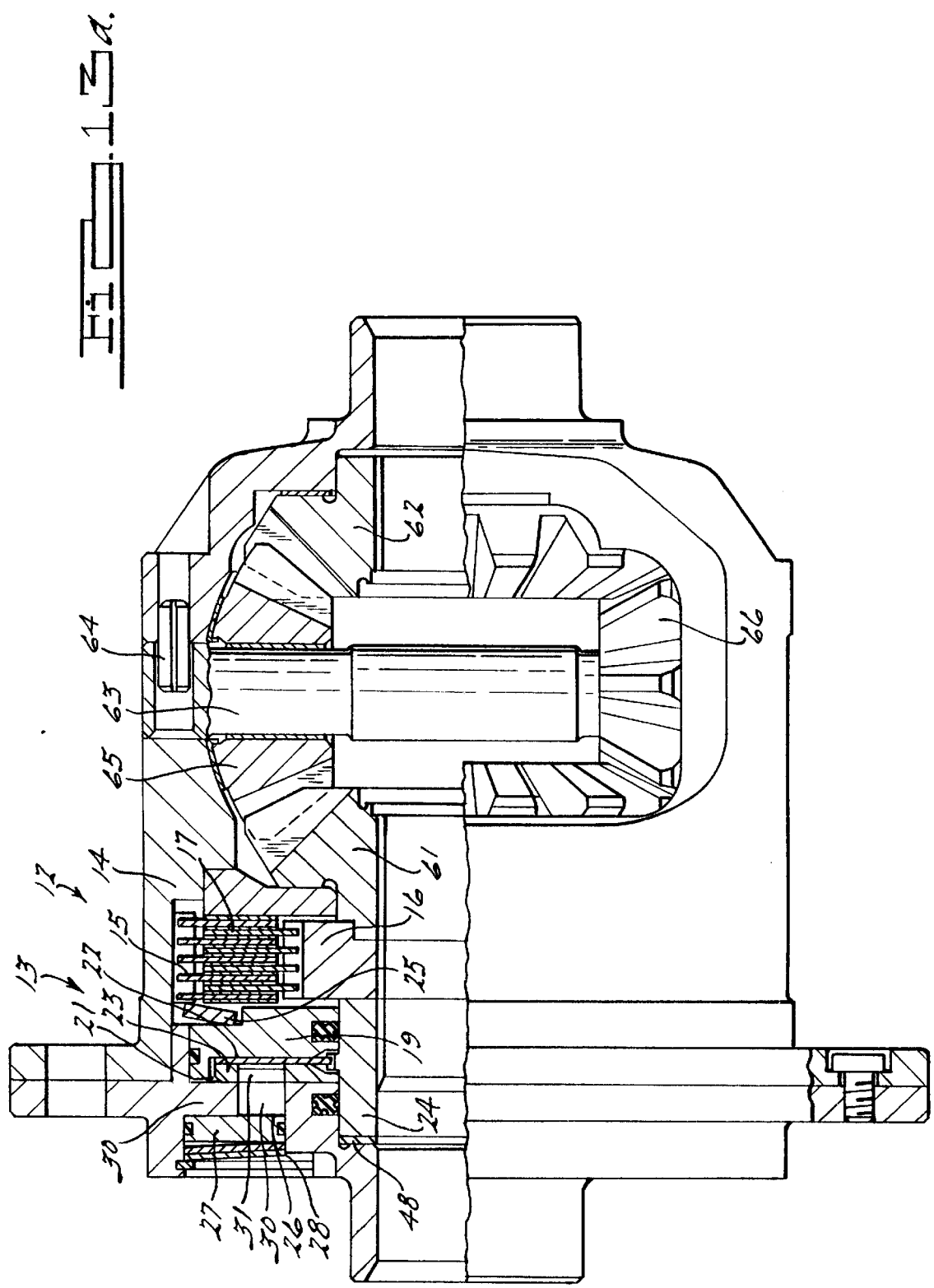
FIG. 17 shows a first embodiment of a vehicle in accordance with the invention.

FIGS. 12a and 12b show embodiments of devices which substantially correspond to those in FIG. 2a, so that there is no need to give a description and all reference numbers. Both embodiments comprise a throttling bore 59 and 59' respectively, which in FIG. 12a extends partially radially and in FIG. 12b entirely axially. The cross-section of said throttling bore is partly occupied by a blocking member 60 whose cross-section greatly changes as a function of the temperature, so that the remaining throttling gap which is shown in the form of a detail in the section A—A and has the radial gap thickness S changes as a function of the temperature of the viscous medium. In this way it is possible to compensate for a decrease in the pumping effect resulting from a decrease in viscosity. In accordance with FIG. 8, the throttling gap may be arranged in a throttle opening 49 in such a way that it becomes effective in one direction of relative rotation of the parts only, or in such a way that it remains open in both directions of rotation.

FIG. 13A shows a bevel gear differential in accordance with the invention and an integrated device 13 with a locking friction coupling 12, with the housing 14 with the outer plates 15 of the friction coupling at the same time constituting the differential carrier. The differential comprises axle shaft gears 61, 62 and differential bevel gears 65, 66 supported on a journal 63. The journal 63 is secured in the differential carrier by a pin 64. The hub 16 of the friction coupling 13 with the inner plates 17 is non-rotatably connected to the axle shaft bevel gear 61. The coupling is loaded by a piston 19 which directly forms an end wall of a pressurised chamber 21 which is formed furthermore by a rotational housing 20 and in which there rotates a rotational member 22 together with a hub 24. A pumping and control member 23 is rotatable to a limited extent relative to the rotational housing 20 and comprises a control aperture 31 which, by means of a connecting line 30, communicates with a reservoir 26 which, as shown in the illustration, is reduced to 0 and is delimited by a piston 19 which is supported on the housing 20 by means of springs 28.

Between the device 12 and the friction coupling 13 there is provided a plate spring 25 which is supported on the housing 14 and, in a pretensioned way, acts on the piston 19. In consequence, the piston 19 does not load the friction coupling 13 until there exists a sufficiently high speed differential between the hub 24 and the rotational housing 20, i.e. not until the force of the piston 19 exceeds the force of the spring 25. The axle shaft gear 61, the hub 16 of the friction coupling 12 and the hub 24 of the device 13 may be non-rotatably connected to one another by an axle shaft insertable into their inner toothings. The axle shaft gear 61 is axially supported on the housing 14, 20 by means of the hubs 16, 24 and a stop disc 48. As a result, any reaction forces between the differential bevel gears 65, 66 and the axle shaft bevel gears 61, 62 do not influence the effect of the device 12 which, as a function of the differential speed, controls the self-inhibiting function of the bevel gear differential.

FIG. 13B shows a bevel gear differential in accordance with the invention and an integrated device 113 with a locking friction coupling 112, with the housing 114 with the outer plates 115 at the same time constituting the differential carrier. The differential comprises axle shaft bevel gears 161, 162 and differential bevel gears 165, 166 supported on a journal 163. The journal 163 is secured in the differential carrier by a pin 164. The hub 116 of the friction coupling 113 with the inner plates 117 is non-rotatably connected to the axle shaft gear 161. The coupling is loaded by a piston 119 which directly forms an end wall of a pressurised chamber 121 which is formed furthermore by a rotational housing 120 and in which there rotates a rotational member 122 with a hub 124. A pumping and control member 123 is rotatable to a limited extent relative to the rotational housing 120 and comprises a control aperture (not illustrated) which communicates with a reservoir 126 by means of an inner connecting line (not illustrated). Said reservoir is delimited by a piston 127 which is supported on the housing 120 by means of springs 128.

Between the device 113 and the friction coupling 112 there is provided a plate spring 125 which is supported on the housing 114 and, in a pretensioned condition, acts on the piston 119; there is also provided a pressure plate 118 for transmitting forces from the piston 119 to the friction coupling 112. In consequence, the piston 119 does not load the friction coupling 112 until there exists a sufficiently high speed differential between the hub 124 and the rotational housing 120, i.e. not until the force of the piston 119 exceeds the force of the spring 125. The axle shaft gear 161, the hub 116 of the friction coupling 112 and the hub 124 of the device 113 may be non-rotatably connected to one another by an axle shaft insertable into their inner toothings 167, 176, 178. The axle shaft gear 161 is axially supported on the housing 114, 120 by means of the hubs 116, 124 and a stop disc 148. Between a pressure plate 173 at the friction coupling 112, which pressure plate 173 is arranged so as to be opposed to the pressure plate 118, and the axle shaft gear 161 there is provided an axial gap 185. As a result, any reaction forces between the differential bevel gears 165, 166 and the axle shaft bevel gears 161, 162 do not influence the effect of the device 113 which, as a function of the differential speed, controls the self-inhibiting function of the differential drive. For further details, reference is made to the description of FIG. 15.

Figure 14:
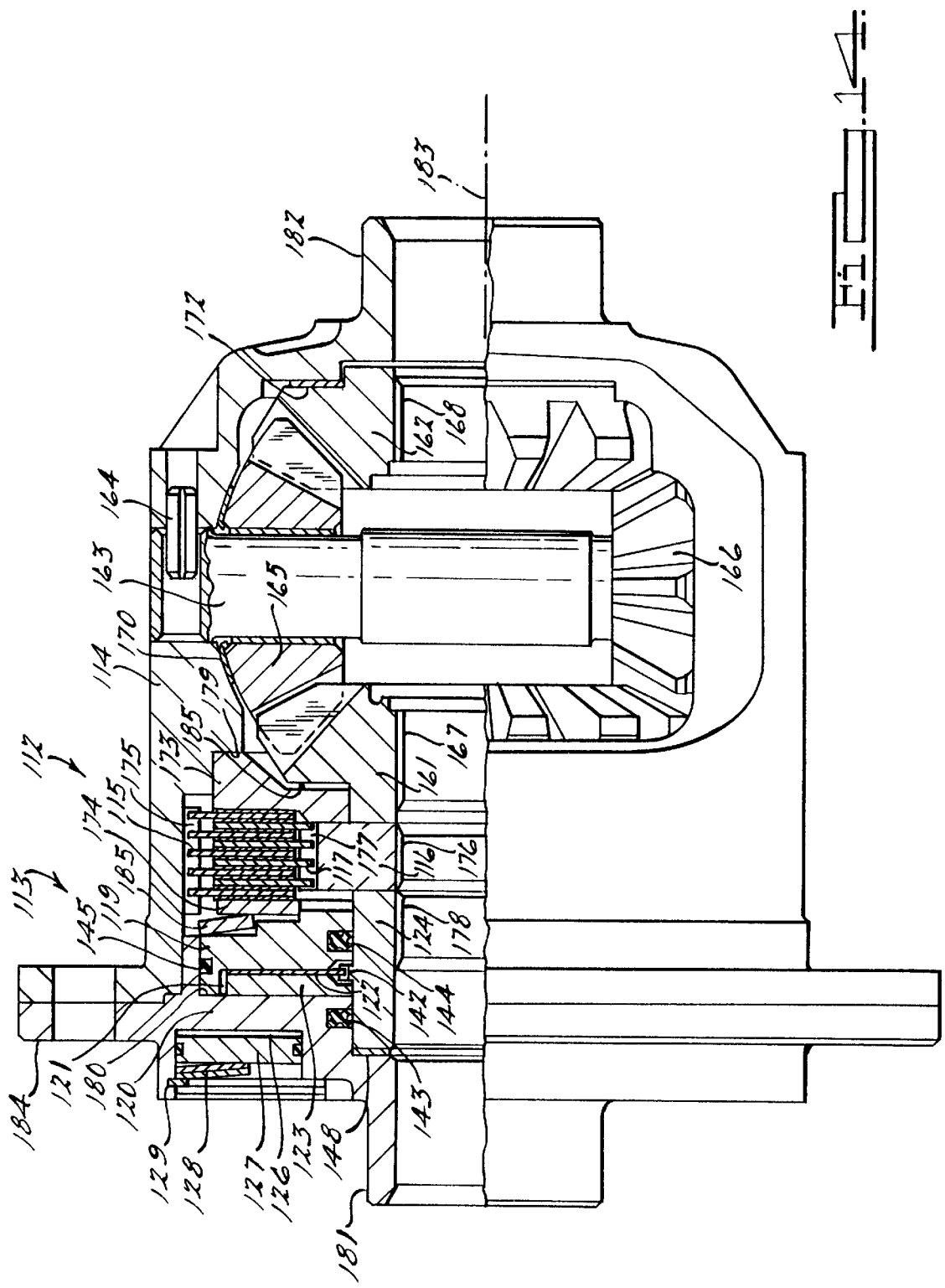
FIG. 14 shows a second embodiment of a bevel gear differential in accordance with the invention.

FIG. 14 shows a bevel gear differential in accordance with the invention and an integrated device 113 with a locking friction coupling 112, with the housing 114 with the outer plates 115 at the same time constituting the differential carrier. The differential comprises axle shaft gears 161, 162 and differential bevel gears 165, 166 supported on a journal 163. The journal 163 is secured in the differential carrier by a pin 164. The hub 116 of the friction coupling 112 is non-rotatably connected to the axle shaft gear 161. The coupling is loaded by a piston 119 which directly forms an end wall of a pressurised chamber 121 which is formed furthermore by a rotational housing 120 and in which there rotates a rotational member 122 with a hub 124. A pumping and control member 123 is rotatable to a limited extent relative to the rotational housing 120 and comprises a control aperture (not illustrated) which communicates with a reservoir 126 by means of an inner connecting line (not illustrated). Said reservoir 126 is delimited by a piston 127 which is supported on the housing 120 by means of springs 128. Between the device 113 and the friction coupling 112 there is provided a plate spring 185 and a pressure plate 174. The plate spring 185, in a pretensioned condition, is directly supported between the piston 119 and the friction plates 115, 117. The pressure plate 174 loads the friction plates 115, 117.

Between the piston 119 and the pressure plate 174 there is provided axial play which is smaller than the spring travel of the plate spring 185. In consequence, the plate spring 185 loads the friction coupling 112 as soon as the hub 124 and the housing 114 rotate at equal speeds and, when a speed differential occurs, will continue to do so until the force of the piston 119 exceeds the force of the spring 185. Subsequently, the piston 119 and pressure plate 124 are blocked and only the force of the piston 119 remains effective. The axle shaft gear 161, the hub 116 of the friction coupling 112 and the hub 124 of the device 113 may be connected to one another by an axle shaft insertable into their inner toothings 167, 176, 178. The axle shaft gear 161 is axially supported on the housing 114, 120 by means of the hub 116, 124 and a stop disc 148. Between a pressure plate 173 at the friction coupling 112, which pressure plate 173 is arranged so as to be opposed to the pressure plate 174, and the axle shaft gear 161 there is provided an axial gap. As a result, any reaction forces between the differential bevel gears 165, 166 and the axle shaft gears 161, 162 do not influence the effect of the device 113 which, as a function of the differential speed, controls the self-inhibiting function of the differential drive. For further details, reference is made to the description of FIG. 16.

Figure 15:
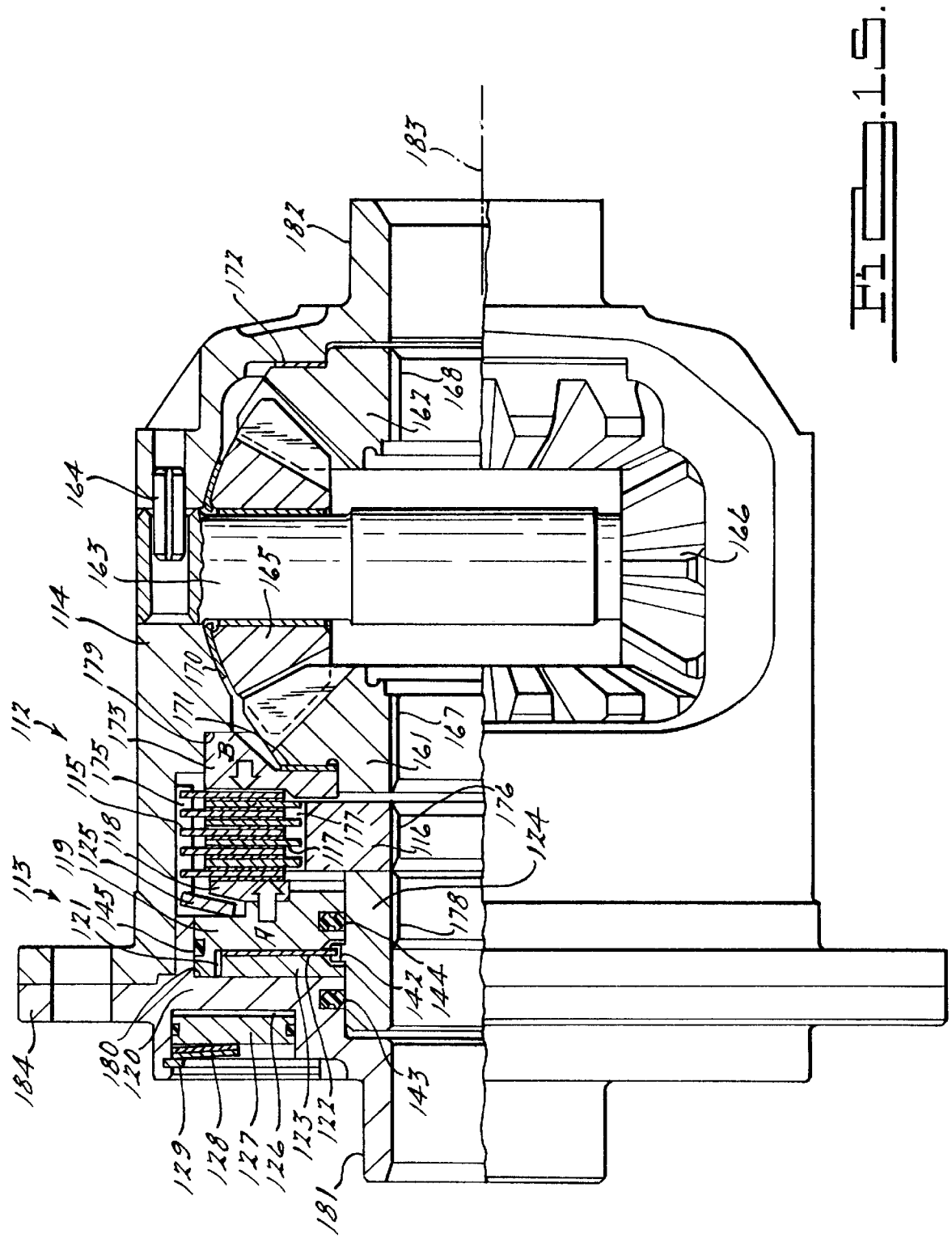
FIG. 15 shows a third embodiment of a bevel gear differential in accordance with the invention.
Figure 16:
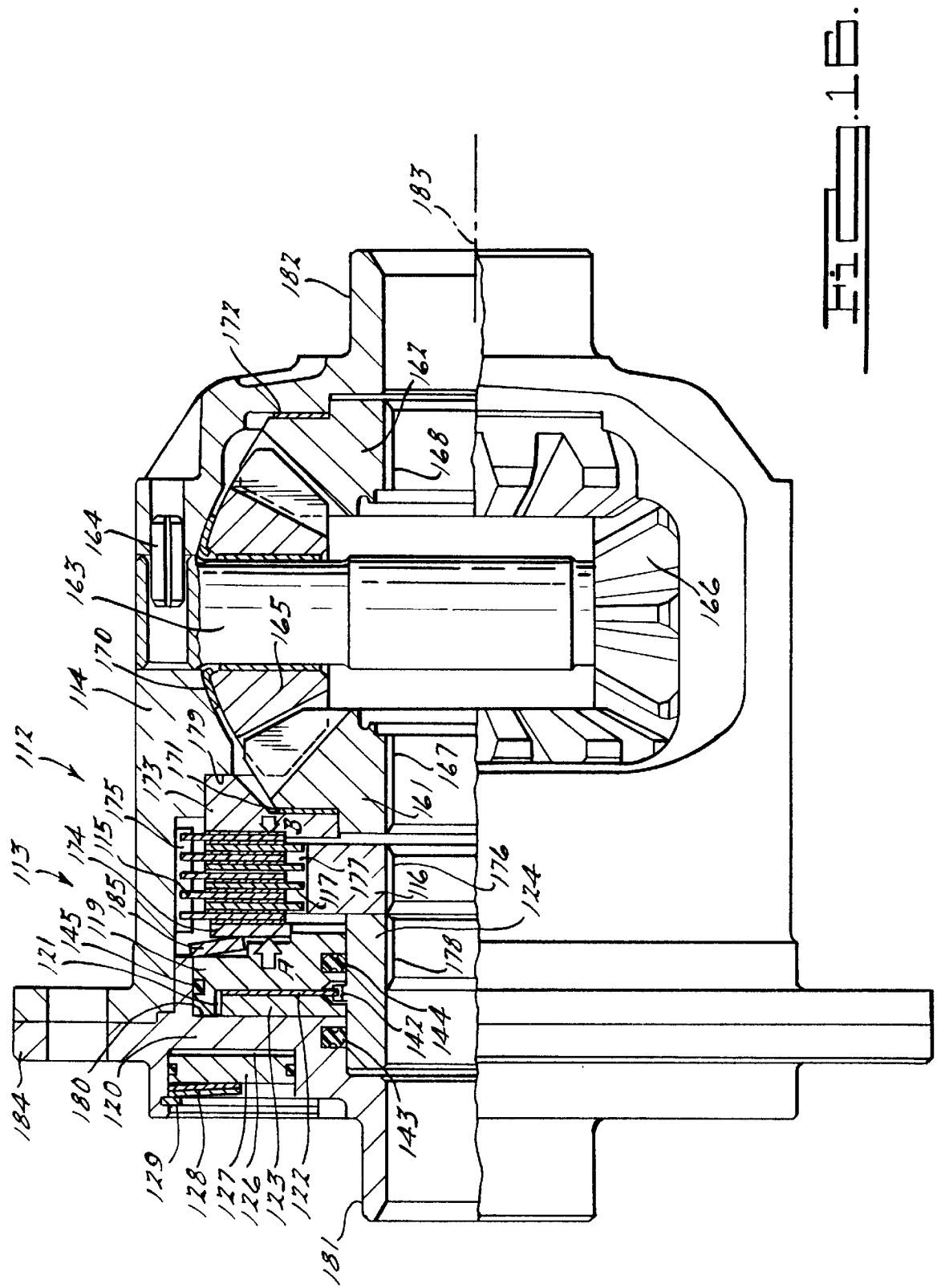
FIG. 16 shows a fourth embodiment of a bevel gear differential in accordance with the invention.

FIGS. 15 and 16 each show the differential carrier of a bevel gear differential 110 in accordance with the invention, with a locking friction coupling 113 and a device 112 which corresponds to a coupling as illustrated in FIGS. 2 to 12. A multi-part housing 114 at the same time forms the differential carrier of the bevel gear differential, the carrier of the friction coupling 112 and the housing of the control device 113. The housing 114 has to be supported, so as to be rotatable around its rotational axis 183, in a drive housing (not illustrated) by means of friction or rolling contact bearings (not illustrated) and bearing projections 181, 182. A driving gear ring (not illustrated)for introducing a driving torque may be screwed to an annular flange 184.

The parts of the differential drive in the housing 114 comprise two axle shaft bevel gears 161, 162 and differential bevel gears 165, 166 supported on a journal 163 inserted into the housing 114 so as to extend normally to the axis thereof. The journal 163 is secured in the housing 114 by means of a pin 164. The differential bevel gears 165, 166 are supported on the journal 163 in a substantially play-free way and are supported relative to the housing 114 by means of spherical stop discs 170. They are thus suitable to introduce reaction forces of the axle shaft bevel gears 161, 162 into the housing 114 in a substantially play-free way. The axle shaft bevel gears 161, 162 are each provided with inner teeth 167, 168 for being non-rotatably connected to the respective counter teeth of insertable axle shafts (not illustrated). The first of the axle shaft bevel gears 161 is arranged so as to be axially displacable in the housing 114, such axial displacement taking place away from the journal 163, due to the reaction forces between the differential bevel gears and the axle shaft bevel gears when torque is introduced around the axis 183 into the housing 114. The first of the axle shaft bevel gears 161, by means of a stop disc 171, acts on a pressure plate 173 which is preferably held non-rotatably but axially movably in the housing 114. The second of the axle shaft bevel gears 162, on the other hand, is supported, in a substantially play-free way, on the housing 114 by means of a stop disc 172. The reaction forces are transmitted directly in the form of tooth forces between the differential bevel gears and the axle shaft bevel gears.

The above-mentioned pressure plate 173 acts on the plate assembly of the friction coupling 112. Its outer plates 115 are non-rotatably and axially movably connected to the housing 114 by means of inter-engaging toothing means 175, whereas the inner plates 117 of the friction coupling are non-rotatably and axially movably connected to the hub 116 of the friction coupling by inter-engaging toothing means 177. Said hub 116 comprises inner teeth 176 which are identical to the inner teeth 167 of the axle shaft bevel gear 161 so that the hub 116 may be non-rotably coupled to a continuously toothed axle shaft by inserting the latter through said hub 116.

From the reverse side, the plate assembly of the friction coupling 112 is loaded by a further pressure plate 118, 174 which has a transmitting function only and is in turn loaded by the piston 119 of the control device 112. The plate assembly, furthermore, comprises a rotational housing 120 forming part of the housing 114, and a hub 124 which, together with the housing 120 and the piston 119 forms a pressurised chamber 121. Furthermore, the control assembly 113 in the pressurised chamber 121 comprises a rotational member 122 and a pumping and control member 123 rotatable relative thereto to a limited extent. The rotational member 122 is axially movably, but non-rotatably connected to the hub 124 by means of toothing means 142. The control device acts on the piston 119 in a way as described in connection with FIGS. 2 to 12. The hub 124 is sealed by sealing means 143, 144 relative to the housing 120 and the piston 119. The piston is sealed by a seal 145 relative to the housing 120. The hub 124 comprises inner teeth 178 which are identical to the inner teeth 176 of the coupling hub 116 and 167 of the axle shaft bevel gear 161 and which, by inserting a continuously toothed axle shaft, may be non-rotatably connected to the two latter parts. The hub 124 of the control device 113 and the hub 116 of the friction coupling 112 axially support one another and are otherwise held axially floatingly in the housing.

As the rotational member 122 is axially movably connected to the hub 124, with the inner plates 117 being axially movably connected to the hub 116, it would also be possible for the two hubs 124, 116 to be axially supported relative to the housing 114 provided the axial movability of the axle shaft bevel gear 161 is ensured in the housing 114.

Furthermore, the rotational housing 120 comprises an annular reservoir 126 which is sealed by an annular piston 127 which is resiliently supported by plate springs 128. The plate springs 128 are supported on a securing ring 129. Between the reservoir 126 and the contents of the pressurised chamber 121 there exists an inner connection (not illustrated) for the purpose of exchanging fluid.

As indicated by arrows A and B, there are provided two different and independent devices for loading the friction coupling 112 whose purpose it is to brake the relative speed of the housing 114 relative to the differential gear 161 non-rotatably connected to the hub 116 in order to balance the torque between the axle shaft gears 161, 162 at a relative speed between the axle shaft gears relative to one another and thus relative to the housing 114 which serves as the differential carrier. The brake force A exerted by the control device 113 via the piston 119 on to the friction coupling 112 has differential-speed-sensing characteristics, as already explained in detail. The brake force B exerted by the reaction forces, i.e. the tooth forces of the axle shaft bevel gears on to the friction coupling 112 has torque-sensing characteristics, i.e. as the torque introduced into the housing 114 increases, the axial component of the reaction force applied to the axle shaft bevel gear 161 also increases. It is thus possible to achieve braking torque characteristics which, at low differential speeds between the axle shaft bevel gears, are entirely torque-dependent because, in this case, the axial force A exerted by the control device is lower than the axial force B and cannot cause the piston 119 to be displaced and which, at increasing differential speeds, increases linearly entirely as a function of the differential speed as soon as the axial force A generated by the control device is greater than the axial force B. with the pressure plate 173 then supporting itself on the end face 179 in the housing 114. The transition between the two sets of characteristics may be influenced by the arrangement and strength of the pretensioned plate springs 125, 185 which additionally act on the friction coupling.

FIG. 15 shows an embodiment in the case of which a plate spring 125 is supported on the housing 114 and acts on the piston 119 against the pressure generated in the control device. In this way it is possible to ensure that independently of the relative magnitude of the brake forces A and B, only the torque-dependent brake force B determines the characteristics of the locking effect until the differential-speed-dependent brake force A is greater than the spring force of the spring 125.

FIG. 16 shows an embodiment in the case of which a plate spring 185 is supported between the piston 119 and the pressure plate 174. In this way it is possible to ensure that independently of the absolute magnitude of the brake forces A and B, the constant pretensioning force of the spring 185 determines the characteristics of the locking effect until the differential-speed-dependent brake force A or the torque-dependent brake force exceeds the value thereof.

Figure 17:
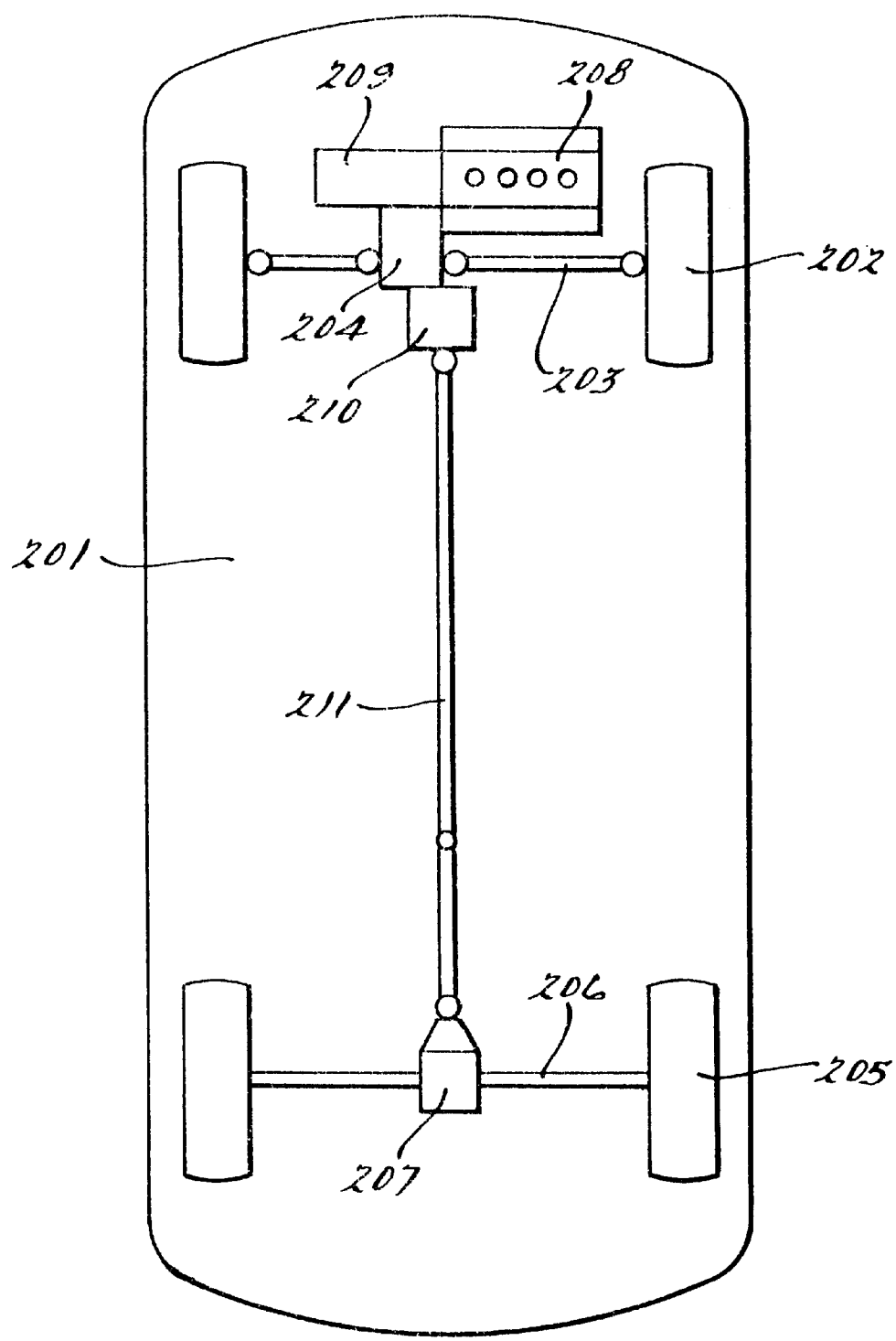
Figure 18:
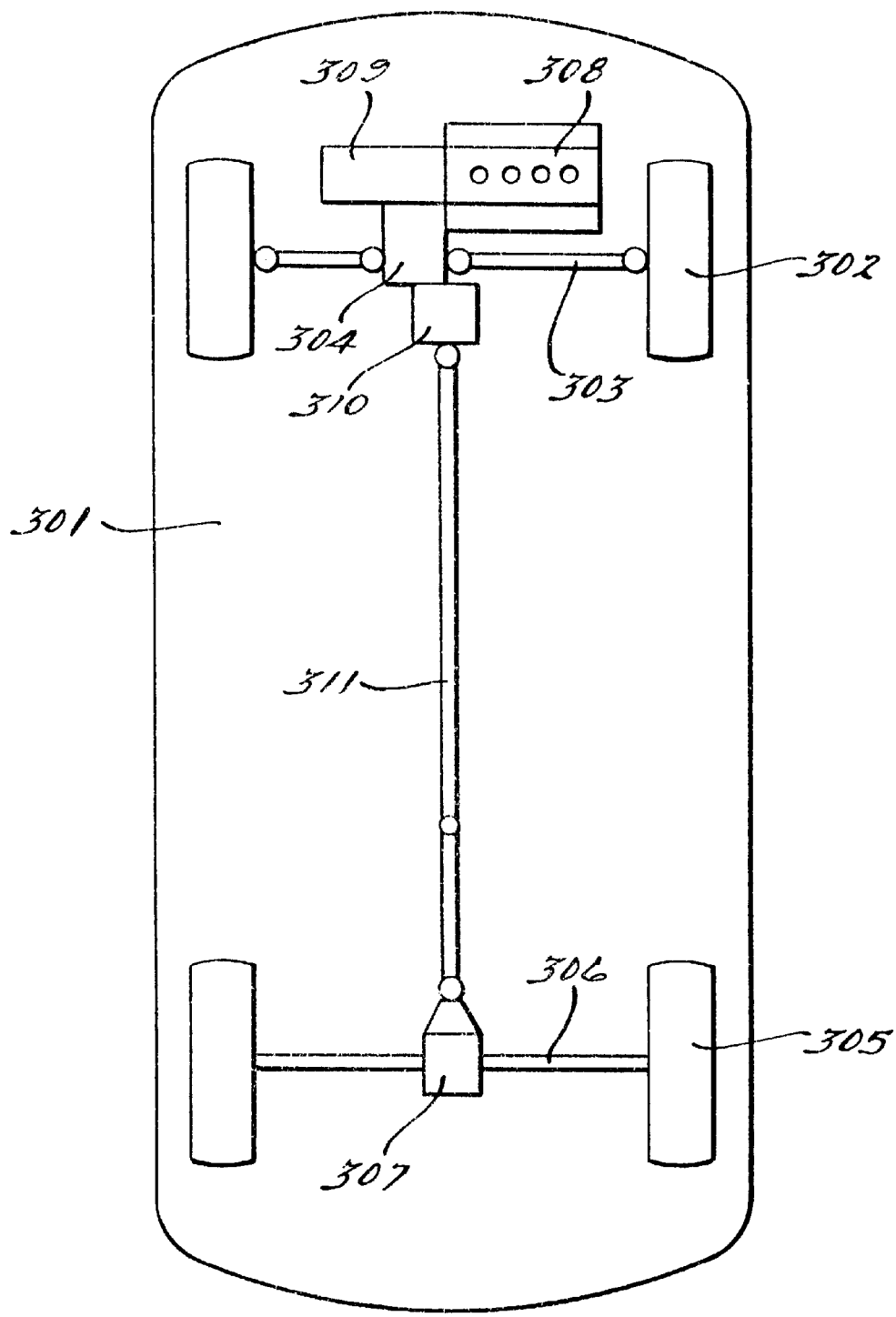
FIG. 18 shows a second embodiment of a vehicle in accordance with the invention.

FIGS. 17 and 18 each show a plan view of a motor vehicle 201, 301 in accordance with the invention, with the following details being identifiable: the motor vehicle is provided with two front wheels 202, 302 which are driven by the driving parts of a front axle 203, 303 having an axle differential 204, 304 and with two rear wheels 205, 305 which are driven by the driving parts of a rear axle 206,306 having an axle differential 207, 307. Said vehicle comprises a transversely fitted front internal combustion engine 208, 308 which constitutes the driving force source and which is connected to a multi-stage or continuously controllable transmission gear 209, 309 for adapting the speed range of the internal combustion engine to the speed range of the motor vehicle.

In FIG. 17, the output end of the reduction gear 209 is connected to the input end of the axle differential 204 of the front axle 203 and, by means of a through-drive, to a coupling unit 210 which operates at the same speed and which, by means of a propeller shaft 211, drives the input end of the differential 207 of the rear axle 206. The torque introduced is distributed to the wheels of the respective axle shaft by the axle differentials 204, 207. The axle differentials 204, 207 may each be equipped with a coupling of one of the two types in accordance with the invention, with one of the parts rotatable relative to one another being formed by the differential carrier or one of the axle shaft gears, and with the other one of the parts rotatable relative to one another being formed by the other of the axle shaft gears. Especially, each axle differential may be of the type as proposed by the invention. The coupling 210 may be as proposed by the invention, with one of the parts rotatable relative to one another being formed by the driving parts of the transmission gear 209 and the other one of the parts rotatable to one another being formed by the connecting parts of the propeller shaft 211.

In FIG. 18, the motor vehicle deviates from that shown in FIG. 17 in that it comprises a central differential drive 310 whose input end, by means of a through-drive, is connected to the output end of the transmission gear 309. The central differential drive 310 distributes the introduced torque to the axle differential 304 of the front axle 303 and to the axle differential 307 of the rear axle 306. Each of the said differential drives, the axle differential drives 306 and 307, and the central differential 310 may be equipped with one of the coupling types as proposed by the invention, with one of the two parts rotatable relative to one another being formed by the differential carrier or one of the axle shaft gears and the other one of the parts rotatable relative to one another being formed by the other one of the axle shaft gears. Especially, each of the differential drives may be a differential as proposed by the invention.

What is claimed is:

1. A method of controlling a coupling for transmitting torque between two parts rotatable relative to one another, comprising:

providing a friction coupling with friction elements which are alternately non-rotatably connected to one and other of the parts rotatable relative to one another, the friction coupling being subjectable to load by at least one adjustable piston which delimits one end of a pressurized chamber in a rotational housing, said pressurized chamber being filled with a viscous fluid connected to a reservoir and accommodating a rotational member rotatable relative thereto;

rotating the rotational member relative to the pressurized chamber;

applying pressure to the piston which is generated by shearing action of a viscous fluid contained in at least one sealed shear channel extending between two ends in the circumferential direction; and controlling supplying fluid to the shear channel from the reservoir and tapping off pressure from the shear channel for the purpose of subjecting the piston to load as a function of the direction of relative rotation of the parts rotatable relative to one another in such a way that the fluid is supplied to what constitutes a front end of the shear channel, with reference to the direction of relative rotation, and that the pressure is tapped off from what constitutes a rear end of the shear channel, with reference to the direction of relative rotation.

2. A coupling for transmitting torque between two parts rotatable relative to one another, comprising:

a friction coupling whose friction elements are alternately non-rotatably connected to the one and the other of the parts rotatable relative to one another, said friction coupling being subjectable to load by at least one adjustable piston which delimits one end of a pressurized chamber, which pressurized chamber is filled with a viscous fluid, which is connected to a reservoir and whose rotational housing is formed by one of the rotatable parts and the piston and in which there rotates a rotational member connected to the other one of the rotatable parts;

rotational faces of the rotational member and counter faces of a pumping and control member positioned in the pressurized chamber include at least one sealed shear channel which is formed by a groove laterally delimited by walls and extending between two ends in the circumferential direction and by a surface covering said shear groove and being rotatable relative thereto;

said pumping and control member is rotatable to a limited extent between two end positions;

said groove, by control apertures in the pumping and control member arranged at the end of said groove, is connected to the reservoir positioned in the rotational housing and to the pressurized chamber between the piston and the rotational member such that in two end positions of the pumping and control member, the control aperture arranged at a front end of the groove, with reference to the direction of relative rotation communicates with the reservoir and that the control aperture arranged at a rear end of the groove, with reference to the direction of relative rotation, communicates with the pressurized chamber.

3. A motor vehicle with at least one permanently driven axle, which comprises a differential drive for distributing torque from a driveshaft to the driving wheels of said axles and which comprises torque transmitting means for generating a locking effect between the driving wheels of said axles, the torque transmitting means are formed by a coupling including a friction coupling whose friction elements are alternately non-rotatably connected to the one and the other of the parts rotatable relative to one another, said friction coupling being subjectable to load by at least one adjustable piston which delimits one end of a pressurized chamber, which pressurized chamber is filled with a viscous fluid, which is connected to a reservoir and whose rotational housing is formed by one of the rotatable parts and the piston and in which there rotates a rotational member connected to the other one of the rotatable parts;

rotational faces of the rotational member and counter faces of a pumping and control member positioned in the pressurized chamber include at least one sealed shear channel which is formed by a groove laterally delimited by walls and extending between two ends in the circumferential direction and by a surface covering said shear groove and being rotatable relative thereto;

said pumping and control member is rotatable to a limited extent between two end positions;

said groove, by control apertures in the pumping and control member arranged at the end of said groove, is connected to the reservoir positioned in the rotational housing and to the pressurized chamber between the piston and the rotational member such that in two end positions of the pumping and control member, the control aperture arranged at a front end of the groove, with reference to the direction of relative rotation communicates with the reservoir and that the control aperture arranged at a rear end of the groove, with reference to the direction of relative rotation, communicates with the pressurized chamber.

4. A coupling assembly for transmitting torque between first and second relatively rotatable parts comprising;

a friction coupling having mutually engageable friction elements alternately and nonrotatably connected to respective ones of said first and second parts;

a chamber formed by one of said rotatable parts and filled with a viscous fluid;

a piston mounted in said chamber and movable to load the friction coupling to cause said friction elements to engage;

a first pump member connected to the first rotatable, part to rotate therewith and rotatable with respect to said first part between first and second spaced apart end positions in dependence on a direction of rotation of said first part relative to said second part;

a second pump member connected to the second rotatable part to rotate therewith;

a generally circumferential, laterally-sealed shear channel formed by and between said pump members;

at least two control apertures in the first pump member, said control apertures communicating with the shear channel and spaced apart relative to one another circumferentially along the shear channel;

a reservoir for the viscous fluid; and the shear channel communicating via the control apertures with the reservoir and with the chamber so that upon relative rotation between the first and second pump members, viscous fluid is conveyed by shear forces through one of the control apertures constituting an inlet to said shear channel from the reservoir, along the shear channel and through another of the control apertures constituting an outlet from the channel to said chamber to move the piston thereby loading the coupling and thereby controlling relative rotation between the first and second rotatable parts.

5. An assembly according to claim 4 wherein said control apertures include first and second control apertures at respective ends of the shear channel and wherein in the first end position of the first pump member the first control aperture constitutes the inlet to said shear channel and the second control aperture constitutes the outlet from said shear channel.

6. An assembly according to claim 5 wherein in the second end position of the first pump member the second control aperture constitutes the inlet to said shear channel and the first control aperture constitutes the outlet from said shear channel.

7. An assembly according to claim 5 including a third control aperture in the first pump member and which communicates with said shear channel at a position between said first and second control apertures and which communicates with said reservoir, and wherein in the second end position of the first pump member said third control aperture constitutes the inlet to said shear channel and said first control aperture constitutes the outlet from said shear channel.

8. An assembly according to claim 5 including a third control aperture in the first pump member and which communicates with said shear channel at a position between said first and second control apertures and which communicates with said chamber, and wherein in the second end position of the first pump member said second control aperture constitutes the inlet to said shear channel and said third control aperture constitutes the outlet from said shear channel.

9. An assembly according to claim 4 including at least two connecting apertures in said first rotatable part communicating with said reservoir and a connecting channel in said first rotatable part communicating with said chamber, said control aperture which constitutes the inlet to the shear channel being aligned with a respective one of the connecting apertures in each of said end positions of the first pump member and said control aperture which constitutes the outlet from said shear channel being aligned with said connecting channel in each of said end positions of the first pump member.

10. An assembly according to claim 4 including at least two connecting apertures in said first rotatable part communicating with said chamber and a connecting channel in said first rotatable part communicating with said reservoir, said control aperture which constitutes the outlet from the shear channel being aligned with a respective one of the connecting apertures in each of said end positions of the first pump member and said control aperture which constitutes the inlet to said shear channel being aligned with said connecting channel in each of said end positions of the first pump member.

11. An assembly according to claim 10 wherein a portion of said first rotatable part in which the chamber is formed provides an end wall of the chamber and wherein said connecting channel comprises a radial groove in said end wall.

12. An assembly according to claim 4 including a connecting channel in said first rotatable part communicating with one of said reservoir and said chamber, wherein said first pump member has an intermediate position between said first and second end positions and wherein when said first pump member is in said intermediate position said two control apertures communicate with said connecting channel.

13. An assembly according to claim 4 wherein a portion of said first rotatable part in which the chamber is formed provides an end wall of the chamber, connecting apertures in said end wall and communicating with one of said reservoir and said chamber; the first pump member being disc-like and sealingly engaging said end wall.

14. An assembly according to claim 13 wherein the shear channel comprises a groove in a face of the disc-like first pump member and the second pump member is in a form of a plate which closes a mouth of the groove to form said shear channel.

15. An assembly according to claim 14 including resilient means which presses together the first and second pump members to seal said shear channel formed by said groove and said plate.

16. An assembly according to claim 15 wherein said resilient means is mounted on said piston.

17. An assembly according to claim 15 wherein the first pump member is moved between its first and second end positions by frictional engagement between the first and second pump members.

18. An assembly according to claim 4 including spring means interposed between the first part and the piston.

19. An assembly according to claim 4 wherein the reservoir is pressurized with respect to said shear channel when there is relative rotation between the pump member.

20. An assembly according to claim 19 wherein the reservoir is provided in said first rotatable part and means tending to minimize volume of the reservoir.

21. An assembly according to claim 4 including a throttle opening between said reservoir and said chamber.

22. An assembly according to claim 21 including means to vary a size of the throttle opening with a temperature of the viscous fluid.

23. A differential device comprising first, second and third rotatable members, differential gearing interconnecting said members;
first and second relatively rotatable parts;
means connecting said first and second parts to the first and second members of said differential gearing, respectively;
a friction coupling having mutually engageable friction elements alternately and non-rotatably connected to respective ones of said first and second parts;
a chamber formed by one of said rotatable parts and filled with a viscous fluid;
a piston mounted in said chamber and movable to load the friction coupling to cause said friction elements to engage;
a first pump member connected to the first rotatable part to rotate therewith and rotatable with respect to said first part between first and second spaced apart end positions in dependence on a direction of rotation of said first part relative to said second part;
a second pump member connected to the second rotatable part to rotate therewith;
a generally circumferential, laterally-sealed shear channel formed by and between said pump members;
at least two control apertures in the first pump member, said control apertures communicating with the shear channel and spaced apart relative to one another circumferentially along the shear channel;
a reservoir for the viscous fluid; and
the shear channel communicating via the control apertures with the reservoir and with the chamber so that upon relative rotation between the first and second pump members, viscous fluid is conveyed by shear forces through one of the control apertures constituting an inlet to said shear channel from the reservoir, along the shear channel and through another of the control apertures constituting an outlet from the channel to said chamber to move the piston thereby loading the coupling and thereby controlling relative rotation between the first and second rotatable members.

24. A differential device according to claim 23 wherein said control apertures include first and second control apertures at respective ends of the shear channel and wherein in the first end position of the first pump member the first control aperture constitutes the inlet to said shear channel and the second control aperture constitutes the outlet from said shear channel.

25. A differential device according to claim 23 wherein in the second end position of the first pump member the second control aperture constitutes the inlet to said shear channel and the first control aperture constitutes the outlet from said shear channel.

26. A differential device according to claim 23 including a third control aperture in the first pump member and which communicates with said shear channel at a position between said first and second control apertures and which communicates with said reservoir, and wherein in the second end position of the first pump member said third control aperture constitutes the inlet to said shear channel and said first control aperture constitutes the outlet from said shear channel.

27. A differential device according to claim 23 including a third control aperture in the first pump member and which communicates with said shear channel at a position between said first and second control apertures and which communicates with said chamber, and wherein in the second end position of the first pump member said second control aperture constitutes the inlet to said shear channel and said third control aperture constitutes the outlet from said shear channel.

28. A differential device according to claim 23 including at least two connecting apertures in said first rotatable part communicating with said reservoir and a connecting channel in said first rotatable part communicating with said chamber, said control aperture which constitutes the inlet to the shear channel being aligned with a respective one of the connecting apertures in each of said end positions of the first pump member and said control aperture which constitutes the outlet from said shear channel being aligned with said connecting channel in each of said end positions of the first pump member.

29. A differential device according to claim 23 including at least two connecting apertures in said first rotatable part communicating with said chamber and a connecting channel in said first rotatable part communicating with said reservoir, said control aperture which constitutes the outlet from the shear channel being aligned with a respective one of the connecting apertures in each of said end positions of the first pump member and said control aperture which constitutes the inlet to said shear channel being aligned with said connecting channel in each of said end positions of the first pump member.

30. A differential device according to claim 28 wherein a portion of said first rotatable part in which the chamber is formed provides an end wall of the chamber and wherein the connecting channel comprises a radial groove in said end wall.

31. A differential device according to claim 23 including a connecting channel in said first rotatable part communicating with one of said reservoir and said chamber, wherein said first pump member has an intermediate position between said first and second end positions and wherein when said first pump member is in said intermediate position both of said control apertures communicate with said connecting channel.

32. A differential device according to claim 23 wherein a portion of said first rotatable part in which the chamber is formed provides an end wall of the chamber, control apertures in said end wall and communicating with one of said reservoir and said chamber; the first pump member being disc-like and sealingly engaging said end wall.

33. A differential device according to claim 32 wherein the shear channel comprises a groove in a face of the disc-like first pump member and the second pump member is in the form of a plate which closes a mouth of the groove to form said shear channel.

34. A differential device according to claim 33 including resilient means which presses together the first and second pump members to seal said shear channel formed by said groove and said plate.

35. A differential device according to claim 34 wherein said resilient means is mounted on said piston.

36. A differential device according to claim 34 wherein the first pump member is moved between its first and second end positions by frictional engagement between the first and second pump members.

37. A differential device according to claim 23 including spring means interposed between the first part and the piston.

38. A differential device according to claim 23 wherein the reservoir is pressurized with respect to said shear channel when there is relative rotation between the pump member.

39. A differential device according to claim 23 wherein the reservoir is provided in said first rotatable part and means tending to minimize a volume of the reservoir.

40. A differential device according to claim 23 including a throttle opening between said reservoir and said chamber.

41. A differential device according to claim 38 including means to vary a size of a throttle opening with a temperature of the viscous fluid.

42. A motor vehicle comprising an engine;
first and second driven axles;
first means connected between the engine and the first axle to provide a permanent drive thereto; and
second means connected between the engine and the second axle to provide an intermittent drive thereto;
first and second relatively rotatable parts;
means connecting said first and second rotatable parts to said engine and to said second axle respectively;
a friction coupling having mutually engageable friction elements alternately and non-rotatably connected to respective ones of said first and second rotatable parts;
a chamber formed by one of said rotatable parts and filled with a viscous fluid;
a piston mounted in said chamber and movable to load the friction coupling to cause said friction elements to engage;
a first pump member connected to the first rotatable part to rotate therewith and rotatable with respect to said first part between first and second spaced apart end positions in dependence on a direction of rotation of said first part relative to said second part;
a second pump member connected to the second rotatable part to rotate therewith;
a generally circumferential, laterally-sealed shear channel formed by and between said pump members;
at least two control apertures in the first pump member, said control apertures communicating with the shear channel and spaced apart relative to one another circumferentially along the shear channel;
a reservoir for the viscous fluid; and
the shear channel communicating via the control apertures with the reservoir and with the chamber so that upon relative rotation between the first and second pump members, viscous fluid is conveyed by shear forces through one of the control apertures constituting an inlet to said shear channel from the reservoir, along the shear channel and through another of the control apertures constituting an outlet from the channel to said chamber to move the piston thereby loading the coupling and thereby controlling relative rotation between said first and second axles.

43. A motor vehicle with a permanently driven axle and an axle driven from case to case, said vehicle comprises a differential-speed-dependent effective coupling with torque transmitting means between a first and a second part of a driveshaft for the axle driven from case to case, and the torque transmitting means are formed by a coupling including a friction coupling whose friction elements are alternately non-rotatably connected to the one and the other of the parts rotatable relative to one another, said friction coupling being subjectable to load by at least one adjustable piston which delimits one end of a pressurized chamber, which pressurized chamber is filled with a viscous fluid, which is connected to a reservoir and whose rotational housing is formed by one of the rotatable parts and the piston and in which there rotates a rotational member connected to the other one of the rotatable parts;
rotational faces of the rotational member and counter faces of a pumping and control member positioned in the pressurized chamber include at least one sealed shear channel which is formed by a groove laterally delimited by walls and extending between two ends in the circumferential direction and by a surface covering said shear groove and being rotatable relative thereto;
said pumping and control member is rotatable to a limited extent between two end positions;
said groove, by control apertures in the pumping and control member arranged at the end of said groove, is connected to the reservoir positioned in the rotational housing and to the pressurized chamber between the piston and the rotational member such that in two end positions of the pumping and control member, the control aperture arranged at a front end of the groove, with reference to the direction of relative rotation communicates with the reservoir and that the control aperture arranged at a rear end of the groove, with reference to the direction of relative rotation, communicates with the pressurized chamber.

44. A motor vehicle with two permanently driven axles, which comprises a differential drive for distributing torque from a driveshaft to said axles and which comprises torque transmitting means for generating a locking effect between said axles, said torque transmitting means are formed by a coupling including a friction coupling whose friction elements are alternately nonrotatably connected to the one and the other of the parts rotatable relative to one another, said friction coupling being subjectable to load by at least one adjustable piston which delimits one end of a pressurized chamber, which pressurized chamber is filled with a viscous fluid, which is connected to a reservoir and whose rotational housing is formed by one of the rotatable parts and the piston and in which there rotates a rotational member connected to the other one of the rotatable parts;

rotational faces of the rotational member and counter faces of a pumping and control member positioned in the pressurized chamber include at least one sealed shear channel which is formed by a groove laterally delimited by walls and extending between two ends in the circumferential direction and by a surface covering said shear groove and being rotatable relative thereto;

said pumping and control member is rotatable to a limited extent between two end positions;

said groove, by control apertures in the pumping and control member arranged at the end of said groove, is connected to the reservoir positioned in the rotational housing and to the pressurized chamber between the piston and the rotational member such that in two end positions of the pumping and control member, the control aperture arranged at a front end of the groove, with reference to the direction of relative rotation communicates with the reservoir and that the control aperture arranged at a rear end of the groove, with reference to the direction of relative rotation, communicates with the pressurized chamber.

\* \* \* \* \*

UNITED STATES PATENT AND TRADEMARK OFFICE
CERTIFICATE OF CORRECTION

PATENT NO. : 5,935,036

DATED : August 10, 1999

INVENTOR(S) : Gassmann et al.

It is certified that error appears in the above-identified patent and that said Letters Patent is hereby corrected as shown below:

Column 16, Claim 1, line 19, before "one", please insert -- the --;
Column 16, Claim 1, line 19, before "other", please insert -- the --;
Column 16, Claim 2, line 63, after "said", please delete -- shear --;
Column 17, Claim 3, line 13, please delete "axles", and insert therefore, --axle --;
Column 17, Claim 3, line 16, please delete "axles", and insert therefore, --axle --;
Column 17, Claim 3, line 33, after "said", please delete -- shear --;
Column 19, Claim 20, line 40, after "rotatable part and", please insert -- has --;
Column 21, Claim 39, line 48, after "rotatable part and", please insert -- has --;
Column 22, Claim 43, line 55, after "said", please delete -- shear --;
Column 24, Claim 44, line 4, after "said", please delete -- shear --;